US009825336B2

(12) United States Patent
Shaffer, II et al.

(10) Patent No.: US 9,825,336 B2
(45) Date of Patent: Nov. 21, 2017

(54) BIPOLAR BATTERY ASSEMBLY

(71) Applicant: ADVANCED BATTERY CONCEPTS, LLC, Clare, MI (US)

(72) Inventors: Edward O. Shaffer, II, Midland, MI (US); Donald Hobday, Kent (GB)

(73) Assignee: ADVANCED BATTERY CONCEPTS, LLC, Clare, MI (US)

( * ) Notice: Subject to any disclaimer, the term of this patent is extended or adjusted under 35 U.S.C. 154(b) by 0 days.

(21) Appl. No.: 15/589,201

(22) Filed: May 8, 2017

(65) Prior Publication Data

US 2017/0244134 A1    Aug. 24, 2017

Related U.S. Application Data

(63) Continuation of application No. 15/070,117, filed on Mar. 15, 2016, now Pat. No. 9,685,677, which is a
(Continued)

(51) Int. Cl.
*H01M 10/18* (2006.01)
*H01M 2/12* (2006.01)
(Continued)

(52) U.S. Cl.
CPC ............ *H01M 10/18* (2013.01); *H01M 2/06* (2013.01); *H01M 2/1264* (2013.01); *H01M 2004/029* (2013.01)

(58) Field of Classification Search
None
See application file for complete search history.

(56) References Cited

U.S. PATENT DOCUMENTS

| 3,522,104 A | 7/1970 | Biddick |
| 4,008,099 A | 2/1977 | Lindstrom |

(Continued)

FOREIGN PATENT DOCUMENTS

| CH | 248315 A | 4/1947 |
| CN | 101379652 A | 3/2009 |

(Continued)

OTHER PUBLICATIONS

International search report and written opinion for PCT/US2012/033744 mail dated Sep. 20, 2012.
(Continued)

*Primary Examiner* — Sarah A Slifka
(74) *Attorney, Agent, or Firm* — The Dobrusin Law Firm, P.C.

(57) ABSTRACT

The invention relates to an article comprising: a) one or more stacks of battery plates comprising one or more bipolar plates; b) located between each plate is a separator and a liquid electrolyte; further comprising one of more of the features: 1) c) the one or more stacks of battery plates having a plurality of channels passing transversely though the portion of the plates having the cathode and/or the anode deposited thereon; and d) i) one or more seals about the periphery of the channels which prevent the leakage of the liquid electrolyte into the channels, and/or posts located in one or more of the channels having on each end an overlapping portion that covers the channel and sealing surface on the outside of the monopolar plates adjacent to the holes for the transverse channels and applies pressure on the sealing surface of the monopolar plates wherein the pressure is sufficient to withstand pressures created during assembly and operation of electrochemical cells created by the stacks of battery plates; 2) c) a membrane comprising a thermoplastic polymer is disposed about the entire periphery of the
(Continued)

edges of the stack of plates; 3 wherein the separator is in the form of a sheet having adhered to its periphery a frame; and m4) c) an integrated valve and integrated channel communicating with the valve.

20 Claims, 12 Drawing Sheets

Related U.S. Application Data continuation-in-part of application No. 14/345,321, filed as application No. PCT/US2012/033744 on Apr. 16, 2012, now Pat. No. 9,553,329.

(60) Provisional application No. 61/550,657, filed on Oct. 24, 2011.

(51) Int. Cl.
H01M 2/06 (2006.01)
H01M 4/02 (2006.01)

(56) References Cited

U.S. PATENT DOCUMENTS

| | | | |
|---|---|---|---|
| 4,098,967 A | 7/1978 | Biddick | |
| 4,510,219 A | 4/1985 | Rowlette | |
| 4,542,082 A | 9/1985 | Rowlette | |
| 4,637,970 A | 1/1987 | Yeh | |
| 4,658,499 A | 4/1987 | Rowlette | |
| 4,752,545 A | 6/1988 | Brecht | |
| 4,861,686 A | 8/1989 | Snyder | |
| 4,900,643 A | 2/1990 | Eskra | |
| 5,035,045 A | 7/1991 | Bowen | |
| 5,114,807 A | 5/1992 | Rowlette | |
| 5,288,565 A | 2/1994 | Gruenstern | |
| 5,308,718 A | 5/1994 | Eidler et al. | |
| 5,393,617 A | 2/1995 | Klein | |
| 5,429,643 A | 7/1995 | Lund | |
| 5,470,679 A | 11/1995 | Lund et al. | |
| 5,510,211 A | 4/1996 | Sundberg | |
| 5,582,937 A | 12/1996 | LaFollette | |
| 5,585,209 A | 12/1996 | Feldstein | |
| 5,593,797 A | 1/1997 | Brecht | |
| 5,682,671 A | 11/1997 | Lund et al. | |
| 5,688,615 A | 11/1997 | Mrotek | |
| 5,800,946 A | 9/1998 | Grosvenor | |
| 5,916,709 A | 6/1999 | Arias | |
| 6,017,653 A | 1/2000 | Petrakovich | |
| 6,077,623 A | 6/2000 | Grosvenor | |
| 6,139,987 A | 10/2000 | Koo et al. | |
| 6,174,337 B1 | 1/2001 | Keenan | |
| 7,275,130 B2 | 9/2007 | Klein | |
| 8,357,469 B2 | 1/2013 | Shaffer, II et al. | |
| 2004/0072074 A1 | 4/2004 | Partington | |
| 2006/0292443 A1 | 12/2006 | Ogg et al. | |
| 2007/0148542 A1 | 6/2007 | Szymborski | |
| 2009/0042099 A1 | 2/2009 | Tatematsu | |
| 2010/0183920 A1 | 7/2010 | Shaffer, II | |
| 2011/0091770 A1 | 4/2011 | Han et al. | |
| 2011/0183166 A1 | 7/2011 | Suga et al. | |
| 2014/0087237 A1 | 3/2014 | Dhar et al. | |
| 2014/0349147 A1 | 11/2014 | Shaffer, II et al. | |
| 2015/0140376 A1 | 5/2015 | Shaffer, II et al. | |
| 2016/0197373 A1 | 7/2016 | Shaffer, II et al. | |

FOREIGN PATENT DOCUMENTS

| | | |
|---|---|---|
| DE | 2160868 A1 | 6/1973 |
| DE | 19608326 A1 | 9/1997 |
| DE | 10058381 A1 | 6/2002 |
| DE | 102004018619 A1 | 11/2005 |
| EP | 0402265 A1 | 12/1990 |
| EP | 1329973 A1 | 7/2003 |
| EP | 1418638 A2 | 5/2004 |
| EP | 1986250 A1 | 10/2008 |
| EP | 2017918 A1 | 1/2009 |
| EP | 2405524 A1 | 1/2012 |
| EP | 2645450 A1 | 10/2013 |
| JP | S51069142 A | 6/1976 |
| JP | S59-121787 A | 7/1984 |
| JP | S59138076 A | 8/1984 |
| JP | H09045363 | 2/1997 |
| JP | 2000-340265 | 12/2000 |
| JP | 2003249259 A | 9/2003 |
| JP | 2004-095402 | 3/2004 |
| JP | 2004-158343 A | 6/2004 |
| JP | 2005-056761 | 3/2005 |
| JP | 2005259379 A | 9/2005 |
| JP | 2007-242593 A | 9/2007 |
| JP | 2010-251159 A | 11/2010 |
| JP | 2010-277862 A | 12/2010 |
| JP | 2011-009039 A | 1/2011 |
| JP | 5333576 B2 | 11/2013 |
| KR | 10-2001-0097437 | 11/2001 |
| KR | 10-2003-0059930 | 7/2003 |
| KR | 10-0494360 B1 | 6/2005 |
| KR | 10-2010-0033831 A | 3/2010 |
| WO | 93/01624 A1 | 1/1993 |
| WO | 94/07272 A1 | 3/1994 |
| WO | 2001/03224 A1 | 1/2001 |
| WO | 2006/105187 A1 | 10/2006 |
| WO | 2007/132621 A1 | 11/2007 |
| WO | 2010/085474 A1 | 7/2010 |
| WO | 2010/100979 A1 | 9/2010 |
| WO | 2013/062623 A1 | 5/2013 |

OTHER PUBLICATIONS

International Preliminary Report on Patentability for PCT/US2012/033744 dated Jan. 1, 2014.
European Office Action for Application No. EP14200182 dated Sep. 13, 2016.
European Office Action for Application No. 14200182.5 dated Feb. 1, 2016.
Korean Office Action for Application No. 10-2015-7033939 dated Jul. 1, 2016.
Korean Office Action for Application No. 10-2015-7034625 dated Feb. 18, 2016.
Korean Office Action for Application No. 10-2015-7033939 dated Feb. 18, 2016.
Korean Intellectual Property Office Notice of Preliminary Rejection for Application No. 10-2014-7034659 dated Apr. 17, 2015.
Korean Intellectual Property Office Notice of Preliminary Rejection for Application No. 10-2014-7010689 dated Apr. 17, 2015.
European Search Report for Application No. EP14200182 dated Apr. 1, 2015.
State Intellectual Property Office of The People's Republic of China for Application No. 201280052008.1 dated May 27, 2016.

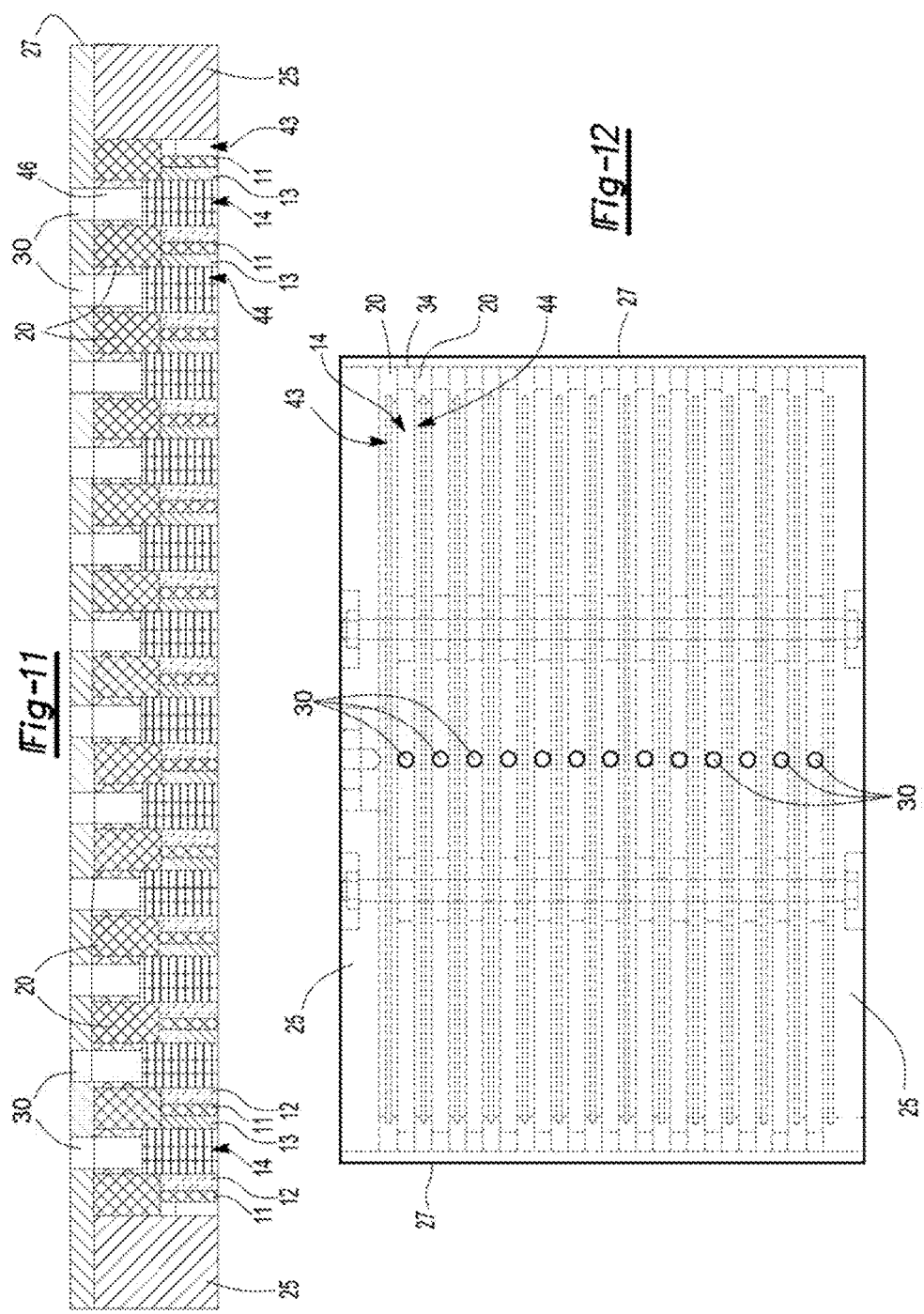

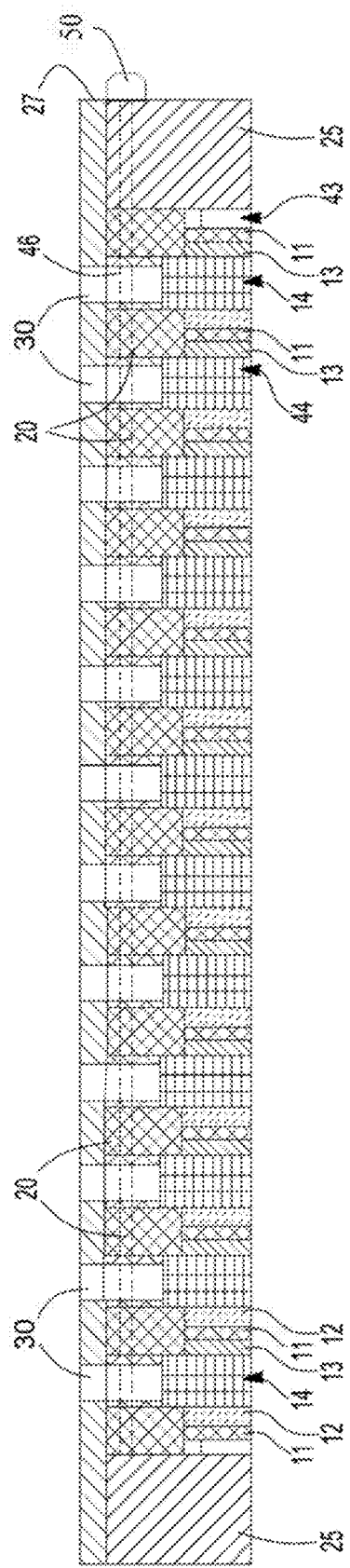

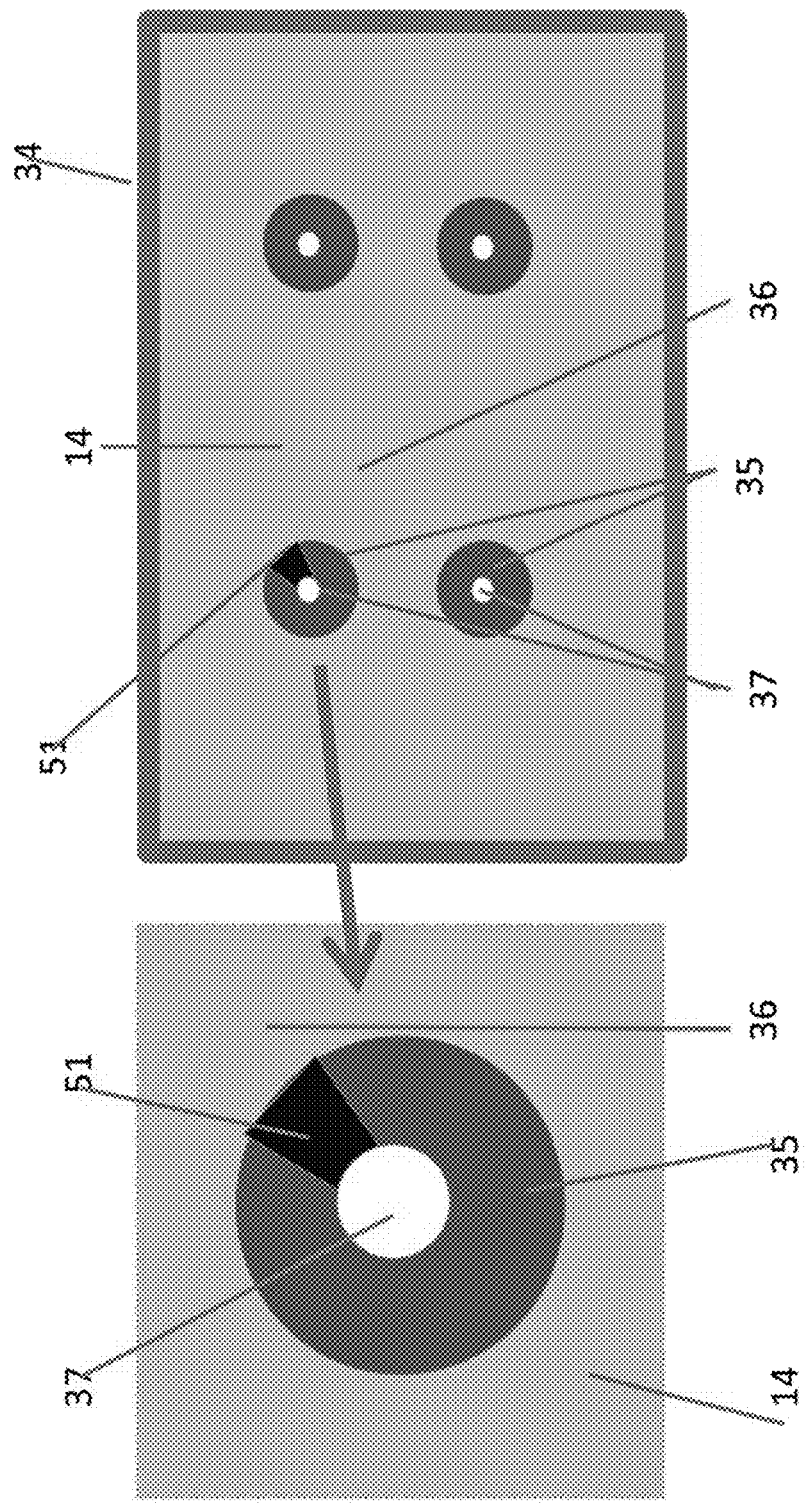

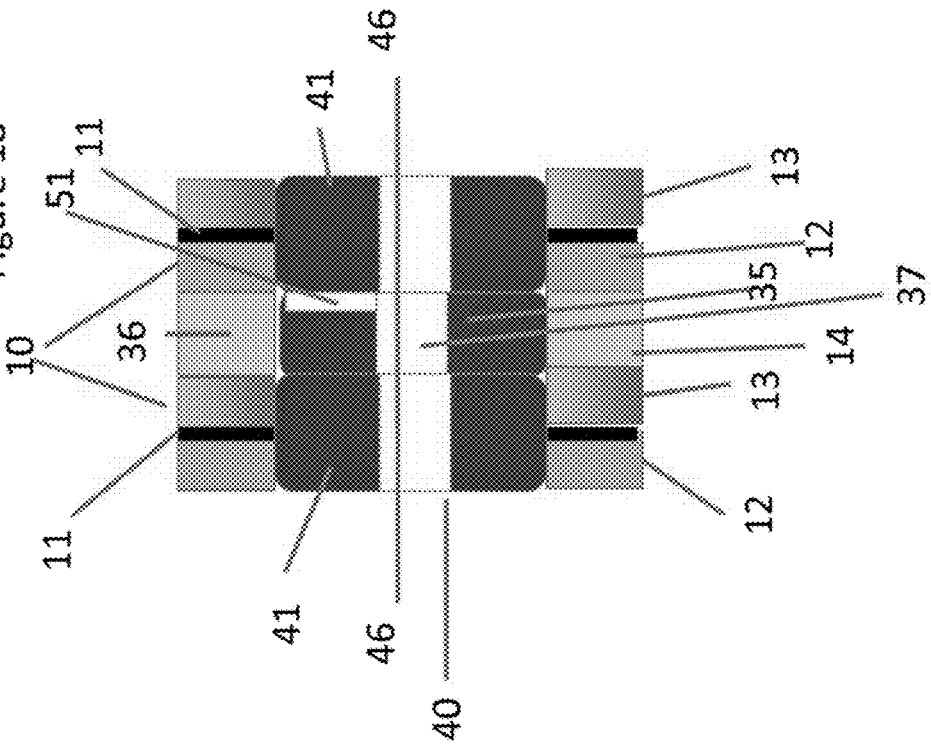
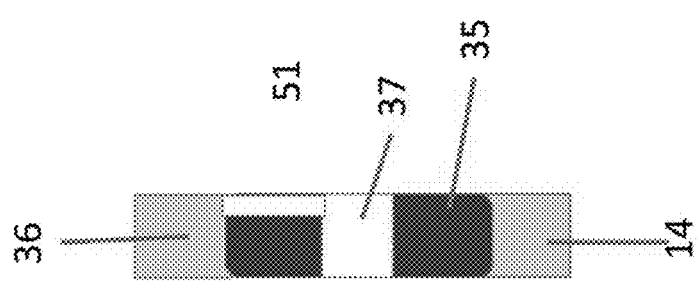

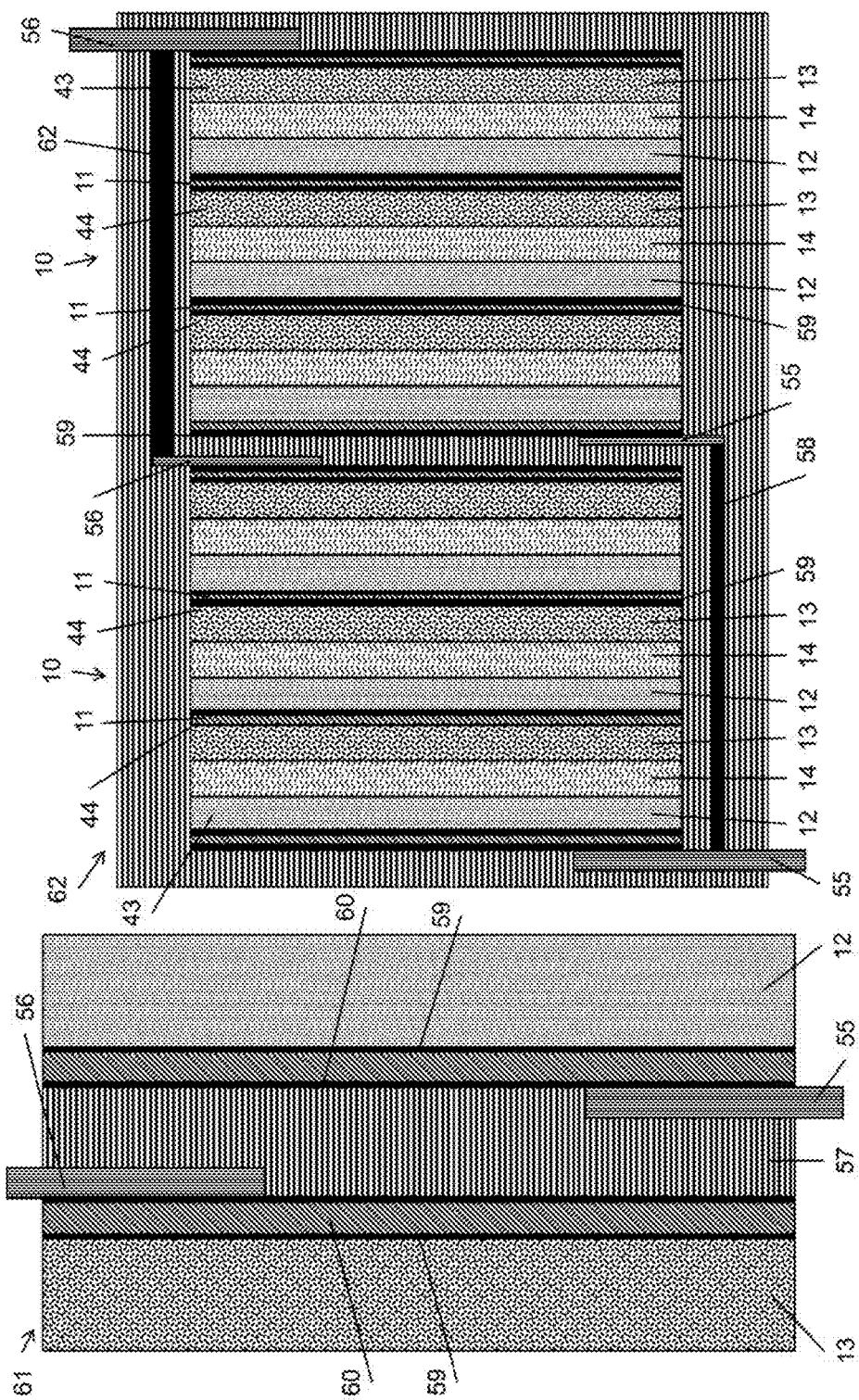

BIPOLAR BATTERY ASSEMBLY

CROSS REFERENCE TO RELATED APPLICATIONS

This application is a continuation-in-part of co-pending application U.S. Ser. No. 14/345,321, filed Mar. 17, 2014 which a national phase application of Patent Cooperation Treaty application PCT/US2012/033744, filed Apr. 16, 2012 which claims priority from U.S. Provisional Application 61/550,657 filed Oct. 24, 2011.

FIELD

The present invention relates generally to a bipolar battery assembly, to methods for the preparation of such assemblies and to methods of using such assemblies.

BACKGROUND

Bipolar batteries are known in the art, see Tatematsu US 2009/0042099, incorporated herein by reference in its entirety. Bipolar batteries provide advantages over other battery designs such as scalability, relatively high energy density, high power density and design flexibility. Bipolar batteries comprise a number of bipolar plates and two monopolar end plates. A bipolar plate comprises a substrate which is in the form of a two sided sheet having a cathodic material, often referred to a Positive Active Material (PAM), on one surface and on the opposite side is an anodic material, often referred to a Negative Active Material (NAM). A conductive sheet may be disposed between the substrate and the anodic material or cathodic material. The bipolar plates are arranged in a stack such that the anodic material of one plate faces the cathodic material of the next plate. In most assemblies there is a battery separator located between the adjacent plates which allow an electrolyte to flow from cathodic material to the anodic material. Disposed in the space between the plates is an electrolyte, which is a material that allows electrons and ions to flow between the anodic and cathodic material. The adjacent surfaces of the bipolar plates with the separator and the electrolyte disposed between the plates form an electrochemical cell wherein electrons and ions are exchanged between the anodic material and the cathodic material. The structure of the battery is arranged such that each cell formed by the bipolar plates is sealed to prevent flow of electrolyte out of the cell The structure used to seal each electro-chemical cell is in contact with the portion of the plates not having anodic or cathodic material on the substrate. In addition the battery separator can extend beyond the portion of the substrate having the anodic and cathodic material disposed thereon to aid in sealing the cells. Each cell has a current conductor connected to the cell to transmit electrons from the cell to one or more terminals from which the electrons are transmitted to a load, in essence another system that utilizes the electrons in the form of electricity. In some embodiments the current conductor in a cell is the conductive sheet which is in contact with additional current conductors which transmit the electrons to the terminals of the battery. At each end of the stack is a monopolar plate having either anodic material or cathodic material disposed on one face. The material on the face of the monopolar plate is selected to form a cell with the opposing face of the bipolar plate at that end of the stack. In particular if the bipolar plate facing the monopolar plate has cathodic material on the face of the plate then the monopolar plate has anodic material on its face and vice versa. In conventional designs the stack of battery plates are disposed in a case which is sealed about the stack of plates and has one or more pairs of positive and negative terminals located on the outside of the battery, each pair is connected to a current conductor further connected to one of more cells as described herein.

Despite the advantages of bipolar battery assemblies, the disadvantages of bipolar battery assemblies have prevented them from being commercialized. Bipolar batteries during operation generate significant internal pressures due to expansion and contraction of anodic and cathodic material, gas evolution during the electrochemical process and heat generated. Because bipolar batteries are scalable higher pressures in the cells can be generated. In addition, the heat evolved can exacerbate the pressures generated and can result in runaway reactions which can generate heat levels that damage the materials of construction of the batteries and render the batteries non-functional. The pressures can cause the seals about the electrochemical cell to rupture and render the cells and battery nonfunctional. Commonly owned patent application titled BIPOLAR BATTERY ASSEMBLY, Shaffer I I, et al. US 2010/0183920, incorporated herein by reference in its entirety, discloses solutions to these problems through improved edge sealing assemblies and bipolar plate designs.

There are still needs to be addressed before bipolar batteries can be commercialized and the full potential of this technology can be achieved. In particular, bipolar battery designs that handle the heat and pressures generated in operation in an improved manner are needed. Present and future users of batteries often have limited packaging space available for batteries and batteries that can be adapted to available packaging space are needed. Most systems using batteries also desire lighter weight batteries and bipolar batteries which exhibit lower weights, are desired. Bipolar battery designs that reduce parts and complexity, such as special parts used for sealing of the electrical cells and separate cases are desired. Batteries that minimize volume and increase power output are desired, that is batteries with enhanced power density are desired. Methods for battery assembly that are simpler and utilize known manufacturing techniques and achieve the abovementioned goals are needed. Batteries that can be scaled to fit the user needs are needed.

SUMMARY

The present disclosure meets one or more of the above needs and is an article comprising: a) two or more stacks of battery plates comprising one or more bipolar plates comprising a substrate having an anode on one surface and a cathode on the opposite surface wherein the substrates conduct current from one surface to the other surface; b) a first monopolar plate having a cathode deposited on one surface, a current collector in contact with the cathode, disposed at one end of the two or more stacks of battery plates; c) a second monopolar plate having an anode deposited on one surface, a current collector in contact with the anode, disposed at one end of the two or more stacks of battery plates; wherein the monopolar plates are located at opposite ends of the two or more stacks of battery plates and the plates are arranged such that the surfaces of the plates having a cathode deposited on the surface face the surface of another plate having an anode deposited on the surface; d) located between each battery plate is a separator and a liquid electrolyte which forms an electrochemical cell; e) disposed between two of the two or more stacks of battery plates is a dual polar battery plate comprising a first conductive substrate having two opposing surfaces with anode material deposited on one surface and a first current conductor in contact with a portion of the opposite surface; a second conductive substrate having two opposing surfaces with cathode material deposited on one surface and a second current conductor in contact with a portion of the opposite surface; and a non-conductive substrate that is disposed between the first and second conductive substrates; the dual polar battery plate is arranged between two of the two or more battery stacks such that the surfaces of the plate having an anode deposited on the surface faces the surface of another plate in a first battery stack having a cathode deposited on the surface and the surface of the plate having a cathode material deposited on the surface faces the surface of the plate in a second battery stack having an anode deposited on the surface; and f) one or more conductive conduits which connects the current conductors directly or indirectly to battery terminals. In some embodiments a membrane is formed by welding a sheet of thermoplastic material about the edge of the plates, preferably by vibration or heat welding. In some embodiments the membrane is formed by molding it about the plates, preferably by injection molding. The battery stacks may be connected in series by connecting the two current conductors for each dual polar plate through a conductive conduit. The battery stacks may be connected in parallel by connecting the positive current conductors, those connected to a cathode through a conductive substrate, through one or more conductive conduits to the positive terminal, directly or indirectly and by connecting the negative current conductors, those connected to an anode through a conductive substrate, through one or more conductive conduits to the negative terminal, directly or indirectly. A conductive connector may be placed in contact with one or both of the monopolar plates. The conductive connector may be placed between the end plate or membrane about the battery assembly and the conductive substrate of the monopolar plate. These are the terminal conductive connectors of a battery assembly and may protrude through the case or membrane about the battery assembly and may function as battery terminals or connect to the battery terminals. The terminal positive conductive connector is in contact with the monopolar end plate with a cathode. The terminal negative conductive connector is in contact with the monopolar end plate with an anode.

The articles disclosed are useful as batteries for the storage of electricity and to generate electricity for use in a variety of environments. The articles disclosed provide high power input with at lower required volumes and weights, thus providing a high power density. The articles are designed to handle the pressures and heat generated during operation without undue damage to the outside surface of the article and so that the liquid electrolyte is contained in the article. The articles disclosed can be assembled using conventional materials and processes. The articles disclosed are capable of achieving the recited advantages without the requirement of complex sealing structures. The articles disclosed can be adapted to different shaped spaces to accommodate a user's packaging space. The design of the articles disclosed allows scaling the size to deliver a variety of energy needs to the user. Assembly of the articles disclosed is more efficient than assembly of articles known in the art. The articles disclosed can withstand pressures of up to about 10 psi, preferably up to about 50 psi and most preferably up to about 100 psi on the end plates of the structure without damaging the end plates. The electrochemical cells are sealed in a manner such that the final assembly can be oriented in any manner which is suitable for the final use and the packaging space available. The devices do not require orientation with a specified top portion and bottom portion requiring orientation with the top oriented up and the bottom oriented down that is in the direction of gravity.

DESCRIPTION OF THE DRAWINGS

FIG. 11 shows a partial cut away view of the end of a stack showing the vent holes along line B-B.

FIG. 12 shows a cutaway view of the assembly of FIG. 9 though the vent holes to the electrochemical cells along plane C-C.

FIG. 15 shows a cutaway view of the assembly of FIG. 13 though an integrated channel in communication with the vent holes to the electrochemical cells along plane D-D.

FIG. 16 illustrates a separator having an absorbent glass mat as shown in FIGS. 5 and 7 containing a vent notch in an insert (vent hole).

FIG. 17 shows a side view of a cut out from a separator having an insert with a notch in the insert forming a vent communicating between the hole and the absorbent glass mat.

FIG. 18 shows a portion of two bipolar plates with a portion of a separator disposed between them with the inserts aligned to form a vent/fill channel.

FIG. 19 shows the construction of a dual polar plate that does not allow transport of electrons or ions between the anode and cathode and provides for electrical communication outside of the battery.

FIG. 20 shows two stacks of batteries separated by a dual polar plate which wherein the two battery stacks are connected in parallel

DETAILED DESCRIPTION

Figure 1:
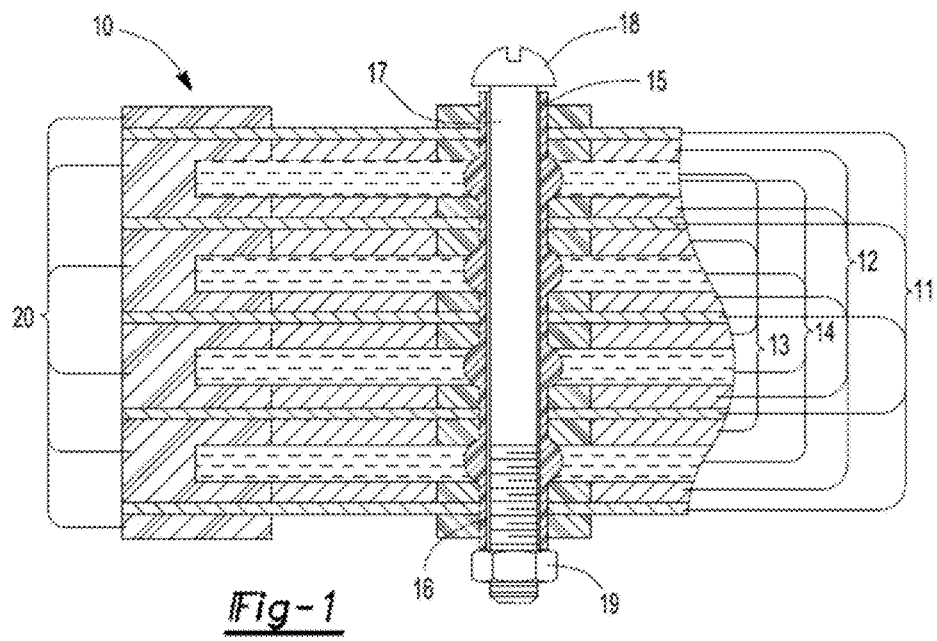
FIG. 1 is a side view of an assembly disclosed.

The explanations and illustrations presented herein are intended to acquaint others skilled in the art with the invention, its principles, and its practical application. Those skilled in the art may adapt and apply the invention in its numerous forms, as may be best suited to the requirements of a particular use. Accordingly, the specific embodiments of the present invention as set forth are not intended as being exhaustive or limiting of the invention. The scope of the invention should be determined with reference to the appended claims, along with the full scope of equivalents to which such claims are entitled. The disclosures of all articles and references, including patent applications and publications, are incorporated by reference for all purposes.

The disclosure relates to an article useful as a battery comprising two or more stacks of a plurality of bipolar plates, two monopolar plates located on each end of the two or more stacks of bipolar plates, having a liquid electrolyte disposed between the bipolar plates; wherein disposed between two of the two or more stacks of battery plates are dual polar battery plates each comprising a first conductive substrate having two opposing surfaces with anode material deposited on one surface and a first current conductor on the opposite surface; a second conductive substrate having two opposing surfaces with cathode material deposited on one surface and a second current conductor on opposite surface and; and a non-conductive substrate that is disposed between the first and second conductive substrates; the dual polar battery plate is arranged between two or more battery stacks such that the surfaces of the plate having an anode deposited on the surface faces the surface of another plate in a first battery stack having a cathode deposited on the surface and the surface of the plate having a cathode material deposited on the surface faces the surface of the plate in a second battery stack having an anode deposited on the surface. Where there are more than two stacks of battery plates a dual polar battery plate may be disposed between each pair of stacks of battery plates. For example if there are four stacks of battery plates there are three dual polar battery plates each with a stack of battery plates adjacent to the anodes and cathodes of the dual polar battery plates. The battery plates have monopolar plates adjacent to the end cathode or anode of the battery stacks to form the end electrochemical cells. Each of the monopolar plates contain a current conductor in contact with a portion of the conductive substrate of the monopolar plate which is disposed away from the anode or cathode. The monopolar current conductors may be disposed between the conductive substrate and the end plate or case about the assembly. These current conductors may protrude through the case or membrane. If these current conductors do not protrude through the case or membrane a current conduit may be present to connect them to the positive or negative terminals.

The articles and processes of the invention may further comprise one or more of the features listed below in any combination, including preferences and alternative embodiments disclosed in this application: wherein the bipolar plates comprise polymeric substrates having a plurality of openings passing through the substrates in communication with both surfaces of the substrates wherein one or more of the openings are straight and have smooth surfaces and are filled with a conductive material that undergoes a phase transformation at a temperature that is below the thermal degradation temperature of the polymeric substrates; a membrane comprising a polymer is disposed about the entire periphery of the stack of plates of two or more battery stacks so as to form a seal about the edges of the plates which prevents the liquid electrolyte from flowing outside of the stack of plates; the membrane has a leading edge and a trailing edge and the leading edge and the trailing edge of the membrane are melt bonded to one another such that the membrane forms a seal about the periphery of the one or more stacks of plates such that electrolytes do not pass from inside of the stack to outside the membrane; the one or more separators comprise sheets having an integrated frame adhered to the periphery of the sheets wherein the integrated frames are adapted to be placed adjacent to the periphery of the substrates of the battery plates; the substrates for the battery plates have raised surfaces about their periphery adapted to be disposed adjacent to the integrated frames of the separators; the integrated frames about the periphery of the separators; an integrated channel which comprises holes or slots in the separators and battery plates that are aligned to form one or more sealed channels which are transverse to the plane of the battery plates and separators and the channels comprise vent holes which communicate with the electrochemical cells; wherein the holes in the separators and the battery plates contain inserts, bosses or sleeves located therein wherein the inserts are adapted to mate to form the integrated channel in the two or more stacks of battery plates; the channels may be formed by inserts that are molded to the battery plates and separators; the channels may be formed by sleeves or bushings placed between the battery plates and separators; the battery plates have indentations adapted for the sleeves and/or bushings to fit into; the sleeves and/or bushings have ends that insert into the battery plates and/or separators; the sleeves or bushings are bonded to the battery plates and/or separators thereby forming seals at the junction; the channel comprises a series of matched inserts or bosses; the inserts, bosses or sleeves in contact with the separator may contain vent holes that communicate between the integrated channel and the electrochemical cells, the vent holes may be formed by notches in the inserts, bossed or sleeves, the article further comprises one or more a valves adapted to release pressure in the sealed stacks of bipolar plates when the pressure reaches a predetermined pressure level which is below a pressure at which damage to the article could occur; a valve is connected to the integrated channel; the one or more stacks of battery plates having a plurality of channels passing transversely though the portion of the plates having the cathode and/or the anode deposited thereon; one or more seals about the periphery of the channels which prevent the leakage of the liquid electrolyte into the channels, and posts located in one or more of the channels having on each end an overlapping portion that covers the channel and sealing surface on the outside of the monopolar plates adjacent to the holes for the transverse channels and applies pressure on the sealing surface of the monopolar plates wherein the pressure is sufficient to withstand pressures created during assembly and operation of electrochemical cells created by the stacks of battery plates; posts located in one or more channels having on each end a portion that covers the channel and a sealing surface on the outside of the monopolar plates adjacent to the holes for the transverse channels and applies pressure on the sealing surface of the monopolar plates wherein the pressure is sufficient to withstand pressures created during assembly and operation of electrochemical cells created by the stacks of battery plates wherein the post is fabricated from a material that is capable of withstanding exposure to the electrolyte and prevents the electrolyte from entering the channels; the article comprises seal about the periphery of the transverse channels passing transversely though the portion of the plates having the cathode and/or the anode deposited thereon; the seal is formed by inserts are molded to the battery plates and separators; the seal is formed by sleeves or bushings placed between the battery plates and separators; the battery plates have indentations adapted for the sleeves and/or bushings to fit into; the sleeves and/or bushings have ends that insert into the battery plates; the sleeves or bushings are bonded to the battery plates thereby forming seals at the junction; the seal comprises a series of matched inserts or bosses; wherein the article does not comprise a seal about the periphery of the transverse channels and the post comprises a material that maintains its structural integrity when exposed to the electrolyte, is nonconductive and seals the transverse channels so as to prevent electrolyte from entering the channels; the posts comprise a ceramic material or a polymeric material of ABS, polypropylene, polyester, thermoplastic polyurethanes, polyolefins, compounded thermoplastic resins or polycarbonates; the posts are pre-molded and comprise nonconductive polymers which are disposed in the channels by interference fit; the posts comprise ABS; the cathode of the monopole plate and the cathode of the internal plate with a cathode and anode current collector are connected to independent positive terminals; the anode of the monopole plate and the anode of the internal plate with a cathode and anode current conductor are connected to independent negative terminals; the internal sets of cells are independently electrochemically formed; the positive conductive conductors are connected and the negative conductive conductors are connected in parallel; or the battery stacks are connected in series; the battery stacks are connected in series by connecting the two current conductors for each dual polar plate through a conductive conduit; the battery stacks may be connected in parallel by connecting the positive current conductors, those connected to a cathode through a conductive substrate, through one or more conductive conduits to the positive terminal, directly or indirectly and by connecting the negative current conductors, those connected to an anode through a conductive substrate, through one or more conductive conduits to the negative terminal, directly or indirectly; a conductive connector may be placed in contact with one or both of the monopolar plates; a conductive connector is placed between the end plate or membrane about the battery assembly and the conductive substrate of the monopolar plate; the terminal conductive connectors of a battery assembly protrude through the case or membrane about the battery assembly and function as battery terminals or connect to the battery terminals; the terminal positive conductive connector is in contact with the monopolar end plate with a cathode; and the terminal negative conductive connector is in contact with the monopolar end plate with an anode.

Articles disclosed comprise one or more bipolar electrode plates, preferably a plurality of bipolar plates. Plurality as used herein means that there are more than one of the plates. A bipolar plate comprises a substrate in the form of a sheet having two opposing faces. Located on the opposing faces are a cathode and an anode. In some embodiments the bipolar plates are arranged in the articles in stacks wherein the cathode of one bipolar plate faces the anode of another bipolar plate or a monopolar plate having an anode and the anode of each bipolar plate faces the cathode of a bipolar or monopolar plate. In the article a space is formed between the adjacent anodes and cathodes wherein the space contains electrolyte which functions with the anode and cathode pair to form an electrochemical cell. The construction of the articles results in closed cells which are sealed from the environment to prevent leakage and short circuiting of the cells. The number of the plates present can be chosen to provide the desired voltage of the battery. The bipolar battery design provides flexibility in the voltage that can be produced. The bipolar plates can have any desired cross sectional shape and the cross sectional shape can be designed to fit the packaging space available in the use environment. Cross-sectional shape refers to the shape of the plates from the perspective of the faces of the sheets. Flexible cross-sectional shapes and sizes allow preparation of the articles disclosed to accommodate the voltage and size needs of the system in which the batteries are utilized. Monopolar plates are disposed on the ends of the stacks of plates to form end cells of the stack of plates. The monopolar plates may be prepared from the same substrates and anodes and cathodes used in the bipolar plates. The side of the monopolar plate opposing the anode or cathode can be the bare substrate when another case is used or it can contain a covering useful to protect the stack. The monopolar plates may have one or more terminals passing through the plate from the end cell to the outside or passing through the side of the case or membrane about the assembly essentially parallel to the plane of the monopolar plates. The terminal matches the polarity of the anode or cathode of the monopolar plate. The terminal functions to transmit the electrons generated in the electrochemical cells to the system that utilizes the generated electrons in the form of electricity. The cathode of the monopole plate and the cathodes of one or more of the internal plates with a cathode current collector may be connected to independent positive terminals. The anode of the monopole plate and the anodes of one or more of the internal plates with an anode current collector may be connected to independent negative terminals. The cathode current collectors may be connected and the anode current collectors may be connected in parallel. The individual terminals may be covered in a membrane leaving only a single connected positive and a single connected negative terminal exposed.

The substrate of the battery plates functions to provide structural support for the cathode and/or the anode; as a cell partition so as to prevent the flow of electrolyte between adjacent cells; cooperating with other battery components to form an electrolyte-tight seal about the bipolar plate edges which may be on the outside surface of the battery; and may transmit electrons from one surface to the other. The substrate can be formed from a variety of materials depending on the function or the battery chemistry. The substrate may be formed from materials that are sufficiently structurally robust to provide the backbone of a desired bipolar electrode plate, withstanding temperatures that exceed the melting points of any conductive materials used in the battery construction, and having high chemical stability during contact with an electrolyte (e.g., sulfuric acid solution) so that the substrate does not degrade upon contact with an electrolyte. The substrate may be formed from suitable materials and/or is configured in a manner that permits the transmission of electricity from one surface of the substrate to an opposite substrate surface. The substrate plate may be formed from an electrically conductive material, e.g., a metallic material, or can be formed from an electrically non-conductive material. Exemplary non-conductive material include polymers; such as thermoset polymers, elastomeric polymers or thermoplastic polymers or any combination thereof. The non-conductive substrate may have electrically conductive features constructed therein or thereon. Examples of polymeric materials that may be employed include polyamide, polyester, polystyrene, polyethylene (including polyethylene terephthalate, high density polyethylene and low density polyethylene), polycarbonates (PC), polypropylene, polyvinyl chloride, bio-based plastics/biopolymers (e.g., polylactic acid), silicone, acrylonitrile butadiene styrene (ABS), or any combination thereof, such as PC/ABS (blends of polycarbonates and acrylonitrile butadiene styrenes). Composite substrates may be utilized, the composite may contain reinforcing materials, such as fibers or fillers commonly known in the art, two different polymeric materials such as a thermoset core and a thermoplastic shell or thermoplastic edge about the periphery of the thermoset polymer, or conductive material disposed in a non-conductive polymer. The substrate may comprise or have at the edge of the plates a thermoplastic material that is bondable, preferably melt bondable. The substrate may have a raised edge about the periphery so as to facilitate stacking of the bipolar plates and formation of electrochemical cells. The raised edge as used in this context means a raised edge on at least one of the two opposing surfaces of the plates. The raised edge may comprise a thermoplastic edge portion formed about another substrate material. The raised edge may function as separator plates as described herein. The substrate or periphery of the substrate a non-conductive material, and may be a thermoplastic material. The frame about or integrated onto the substrate may be comprised of non-conductive material, such as a thermoplastic material. The use of non-conductive material enhances sealing the outside of the battery stack.

The substrate comprises a generally non-electrically conductive substrate (e.g., a dielectric substrate) that includes one or more openings formed therein. The openings may be machined (e.g., milled), formed during fabrication of the substrate (e.g., by a molding or shaping operation), or otherwise fabricated. The openings may have straight and/or smooth internal walls or surfaces. The size and frequency of the openings formed in the substrate may affect the resistivity of the battery. The openings may be formed having a diameter of at least about 0.2 mm. The openings may be formed having a diameter of about 5 mm or less. The openings may be formed having a diameter from about 1.4 mm to about 1.8 mm. The openings may be formed having a density of at least about 0.02 openings per $cm^2$. The openings may be formed having a density of less than about 4 openings per $cm^2$. The openings may be formed having a density from about 2.0 openings per $cm^2$ to about 2.8 openings per $cm^2$. The openings may be filled with an electrically conductive material, e.g., a metallic-containing material. The electrically conductive material may be a material that undergoes a phase transformation at a temperature that is below the thermal degradation temperature of the substrate so that at an operating temperature of the battery assembly that is below the phase transformation temperature, the dielectric substrate has an electrically conductive path via the material admixture between the first surface and the second surface of the substrate. Further, at a temperature that is above the phase transformation temperature, the electrically conductive material admixture undergoes a phase transformation that disables electrical conductivity via the electrically conductive path. For instance, the electrically conductive material may be or include a solder material, e.g., one comprising at least one or a mixture of any two or more of lead, tin, nickel, zinc, lithium, antimony, copper, bismuth, indium or silver. The electrically conductive material may be substantially free of any lead (i.e., it contains at most trace amounts of lead) or it may include lead in a functionally operative amount. The material may include a mixture of lead and tin. For example, it may include a major portion tin and a minor portion of lead (e.g., about 55 to about 65 parts by weight tin and about 35 to about 45 parts by weight lead). The material may exhibit a melting temperature that is below about 240° C., below about 230° C., below about 220° C., below about 210° C. or even below about 200° C. (e.g., in the range of about 180 to about 190° C.). The material may include a eutectic mixture. A feature of using solder as the electrically conductive material for filling the openings is that the solder has a defined melting temperature that can be tailored, depending on the type of solder used, to melt at a temperature that may be unsafe for continued battery operation. Once the solder melts, the substrate opening containing the melted solder is no longer electrically conductive and an open circuit results within the electrode plate. An open circuit may operate to dramatically increase the resistance within the bipolar battery thereby stopping further electrical flow and shutting down unsafe reactions within the battery. Accordingly, the type of electrically conductive material selected fill the openings can vary depending on whether it is desired to include such an internal shut down mechanism within the battery, and if so at what temperature it is desired to effect such an internal shutdown. The substrate will be configured so that in the event of operating conditions that exceed a predetermined condition, the substrate will function to disable operation of the battery by disrupting electrical conductivity through the substrate. For example, the electrically conductive material filling holes in a dielectric substrate will undergo a phase transformation (e.g., it will melt) so that electrical conductivity across the substrate is disrupted. The extent of the disruption may be to partially or even entirely render the function of conducting electricity through the substrate disabled.

Disposed on one surface of the bipolar plates and on some of the monopolar plates is one or more cathodes. The cathode can be in any material that is capable of functioning as a cathode in a battery and can be in any form commonly used in batteries. The cathode is also referred to as positive active material. The positive active material may comprise a composite oxide, a sulfate compound or a phosphate compound of lithium, lead, carbon or a transition metal generally used in a lithium ion, nickel metal hydride or lead acid secondary battery. Examples of the composite oxides include Li/Co based composite oxide such as $LiCoO_2$, Li/Ni based composite oxide such as $LiNiO_2$, Li/Mn based composite oxide such as spinel $LiMn_2O_4$, and Li/Fe based composite materials such as $LiFeO_2$. Exemplary phosphate and sulfur compounds of transition metal and lithium include $LiFePO_4$, $V_2O_5$, $MnO_2$, $TiS_2$, $MoS_2$, $MoO_3$, $PbO_2$, AgO, NiOOH and the like. The cathode material can be in any form which allows the cathode material to function as a cathode in an electrochemical cell. Exemplary forms include formed parts, in paste form, pre-fabricated sheet or film. For lead acid, batteries the preferred cathode material is lead dioxide ($PbO_2$). Disposed on the opposite surface of the bipolar plates and the other monopolar plate are the anodes. The anodes are also referred to as negative active material. Any anode and anode material may be utilized in the assemblies disclosed. The anode material may include any material used in secondary batteries, including lead acid, nickel metal hydrides and lithium ion batteries. Exemplary materials useful in constructing anodes include lead, composite oxides of carbon or lithium and transition metal, (such as a composite oxide of titanium oxide or titanium and lithium) and the like. The anode material for a lead acid battery may be sponge lead. The cathode material can be in any form which allows the cathode material to function as a cathode in an electrochemical cell. Exemplary forms include formed parts, in paste form, pre-fabricated sheet or films. Paste compositions can contain a number of beneficial additives including floc or glass fibers for reinforcement, various ligano-organic compounds for paste stability and conductive additives such as carbon, particularly for negative active materials. For lead acid batteries the preferred form of the anode material is sponge lead. The anode and cathode are chosen to work together to function as an electrochemical cell once a circuit is formed which includes the cells.

The assemblies further comprise separators. The separators are located between the anode and the cathode in electrochemical cells, more specifically separators are located between the bipolar plates or between a bipolar plate and a monopolar plate. The separators preferably have an area that is greater than the area of the adjacent cathode and anode. The separator may completely separate the cathode portion of the cell from the anode portion of the cell. The edges of the separator may contact peripheral edges of the bipolar and monopolar plates which do not have an anode or cathode disposed thereupon so as to completely separate the anode portion of the cell from the cathode portion of the cell. A battery separator functions to partition electrochemical cells; to prevent short circuiting of the cells due to dendrite formation; functions to allow liquid electrolyte, ions, electrons or any combination of these elements to pass through it. Any known battery separator which performs one or more of the recited functions may be utilized in the assemblies of the invention. The separator may be prepared from a nonconductive material, such as porous polymer films, glass mats, porous rubbers, ionically conductive gels or natural materials, such as wood, and the like. The separator may contain pores or tortuous paths through the separator which allows electrolyte, ions, electrons or a combination thereof to pass through the separator. Among exemplary materials useful as separators are absorbent glass mats, and porous ultra-high molecular weight polyolefin membranes and the like.

The separators may have integrated frames. The frames function to match with the edges of adjacent battery plates and to form a seal between the electrochemical cells and the outside of the battery. The frame can be attached to the separator about the periphery of the sheet forming the separator using any means that bonds the separator to the frame and which can withstand exposure to the electrolyte solution, for example by adhesive bonding, melt bonding or molding the frame about the periphery of the separator. The frame can be molded in place by any known molding technic, for example thermoforming, injection molding, roto molding, blow molding, compression molding and the like. The frame may be formed about the separator sheet by injection molding. The frame may contain a raised edge adapted to match raised edges disposed about the periphery of the substrates for the battery plates. Raised edges in one or both of the battery plate substrates and the frames of the separators can be matched to form a common edge for the battery stack and to enhance the seal between the electrochemical cells and the outside of the battery. The separators may have inserts integrated into the separator wherein the inserts function to define the transverse channels through the stack. The inserts may be formed by any known means and are preferably molded in place, preferably by injection molding. Where a separator has both inserts and a frame both parts can be molded in one step, for instance by injection molding. The inserts may contain vent holes to allow communication of selected fluids from the electrochemical cells to the transverse channels. Each of the electrochemical cells may be independently electrochemically formed.

The articles may comprise conductive materials in a shape which facilitates dispersing the electrons flowing in the electrochemical cell so as to ensure electrical connection of the active materials to the substrate and may function as current collectors. Exemplary conductive materials include metal sheets, foils, screens or a plurality of metal wires arranged in a common plane. The battery plates may contain current conduits which transmit the electrons between the stacks of battery plates and the negative and positive battery terminals. The dual polar battery plates contain a negative current conductor disposed on the opposite side of the conductive substrate from the surface containing the anode. The negative current conductor is disposed in contact with the conductive substrate and the nonconductive substrate and protrudes from the battery stack. The protruding portion is contacted with a current conduit that may transport current between the negative current conductor and the negative terminal or the positive current conductor of the same plate. The dual polar battery plates contain a positive current conductor disposed on the opposite side of the conductive substrate from the surface containing the cathode. The positive current conductor is disposed in contact with the conductive substrate and the nonconductive substrate and protrudes from the battery stack. The protruding portion is contacted with a current conduit that transports current between the positive current conductor and the positive terminal or the negative current conductor of the same plate. At least one each of the negative and positive current conductors may protrude out of the battery assembly through a cover about the battery assembly, such as a membrane. The end negative and positive current conductors may protrude out of the battery assembly and may connect to or function as the negative and positive terminals respectively. Positive and negative current conductors may be connected to dual polar battery plates, monopolar battery plates or both types of plates may have the current conductors connected thereto. The positive and negative current conductors which protrude through the membrane or battery case may be in contact with dual polar battery plates or monopolar battery plates. When the battery stacks are connected in parallel the negative current conductors are connected by a negative current conduit to the negative terminal or the negative current conductor that also functions as a negative terminal and the positive current conductors are connected by a positive current conduit to the positive terminal or the positive current conductor that also functions as a positive terminal. When the battery stacks are connected in series a conductive conduit connects the positive current conductor of each dual polar battery plate to the negative current conductor of the same dual polar battery plate. The current conduit comprises any conductive material that transmits current and may be in any configuration of shape that facilitates transmission of current. The metal sheets, screens, foils or wires can be prepared from any conductive metal. Exemplary conductive metals are silver, tin, copper, lead or mixtures of two or more thereof. The selection of the metal is influenced by the anode and cathode materials. In a lead-acid batteries, lead sheets or foils may be used. The metal foils, screens, sheets or wires useful as current collectors may be located between the anode or cathode and the substrate. The metal sheets, screens, foils or wires may be affixed to the substrate. Any method of affixing the metal sheet, screen, foil or wire to the substrate that holds the metal sheet, screen, foil or wire to the substrate in the environment of the cells may be utilized, such as welding or adhesive bonding. The metal sheets, screens, foils or wires may be adhesively bonded to the substrate. Exemplary adhesives useful for this bonding include epoxies, rubber cements, phenolic resins, nitrile rubber compounds or cyanoacrylate glues. The metal sheets, screens, foils or wires may be located between the entire surface of the anode or cathode and the substrate. The metal sheets, screens, foils or wires may cover the entire surface of the substrates. The current collector may be a metal sheet or foil. Where the anode or cathode is in paste form, the paste may be applied to the metal foil or sheet or applied over the metal screen or wires bonded to the substrate. The metal sheet, screen, foil or wires may contact one or more current conductors to transmit electrons to the current conductors. The metal sheets, screens, wires or foils are chosen to be thick enough to disperse electrons flowing through the cells and where appropriate to collect electrons and transmit them to current conductors in the cell. The metal sheets, screens, wires or foils may function as the current conductors. The metal sheets, screens, wires or foils may have a thickness of about 0.75 mm or less, about 0.2 mm or less or about 0.1 mm or less. The metal sheets, screens, foils or wires may have a thickness of about 0.025 mm or greater, about 0.050 mm or greater or about 0.075 mm or greater.

The dual polar battery plates comprise a first conductive substrate having two opposing surfaces with anode material deposited on one surface and a first current conductor in contact with a portion of the opposite surface; a second conductive substrate having two opposing surfaces with cathode material deposited on one surface and a second current conductor in contact with the opposite surface; and a non-conductive substrate that is disposed between the first and second conductive substrates; the dual polar battery plate is arranged between two of the two or more battery stacks such that the surfaces of the plate having an anode deposited on the surface faces the surface of another plate in a first battery stack having a cathode deposited on the surface and the surface of the plate having a cathode material deposited on the surface faces the surface of the plate in a second battery stack having an anode deposited on the surface. The conductive anodes, cathodes, conductive substrates and current conductors of the dual polar batteries are as described herein. Disposed between the first and second conductive substrates is a nonconductive substrate. The nonconductive substrate may be prepared from any nonconductive material as disclosed herein. The nonconductive substrate should have a sufficient area and cross-sectional thickness to insulate between the first substrate and the first current conductor and the second conductive substrate and second current conductor. The non-conductive substrate may have an area that is greater that the area of the cathode or anode on the conductive substrates. The non-conductive substrate may have a thickness of about 0.1 mm or greater or about 0.5 mm greater. The non-conductive substrate may have a thickness of about 1.5 mm or less or about 1.0 mm or less. The nonconductive substrate is arranged to prevent the first and second current collectors from coming into contact with one another. The first and second current collectors have opposite polarities. The non-conductive substrates may be prepared from any of the non-conductive materials useful for the substrates described hereinbefore. The nonconductive substrates may have frames about their periphery wherein the frames are a disclosed with respect to the conductive substrates and separators. The frames may be integrated with the non-conductive substrates.

The battery stacks may be connected in series by connecting the two current conductors for each dual polar plate through a conductive conduit. The battery stacks may be connected in parallel by connecting the positive current conductors, those connected to a cathode through a conductive substrate, through one or more conductive conduits to the positive terminal, directly or indirectly and by connecting the negative current conductors, those connected to an anode through a conductive substrate, through one or more conductive conduits to the negative terminal, directly or indirectly. A conductive connector may be placed in contact with one or both of the monopolar plates. The conductive connector may be placed between the end plate or membrane about the battery assembly and the conductive substrate of the monopolar plate. These are the terminal conductive connectors of a battery assembly and may protrude through the case or membrane about the battery assembly and may function as battery terminals or connect to the battery terminals. The terminal positive conductive connector is in contact with the monopolar end plate with a cathode. The terminal negative conductive connector is in contact with the monopolar end plate with an anode.

The stack of components in the assembly may contain transverse channels passing through the components and the area formed for the electrochemical cells which cells also contain a liquid electrolyte. The stack includes bipolar plates, monopolar plates, separators, anodes, cathodes, optionally current collectors (metal sheets, screens, wires or foils), dual polar battery plates and any other components of the stack which may be utilized. The transverse channels function to house the posts and some of the channels may be left unfilled so as to function as transverse cooling channels or vent/fill channels. The channels pass through the anode, cathode and the cells containing the electrolyte. The channels may be sealed to prevent electrolytes and gasses evolved during operation from entering the channels. Any method of sealing which achieves this objective may be utilized. The size and shape of the channels can be any size or shape which allows them to house the posts and the posts to support the end plate and edges of the substrates to prevent leakage of electrolytes and gasses evolved during operation and to prevent the compressive forces arising during operation from damaging components and the seal for the individual electrochemical cells or to function as cooling or vent channels. The shape of the channels may be round, elliptical or polygonal, such as square, rectangular, hexagonal and the like. The size of the channels housing posts is chosen to accommodate the posts used. The channels comprise a series of holes in the components arranged so a post can be placed in the channel formed or so that a fluid can be transmitted through the channel for cooling or for venting and filling. The number of channels is chosen to support the end plate and edges of the substrates to prevent leakage of electrolytes and gasses evolved during operation and to prevent the compressive forces arising during operation from damaging components and the seal for the individual electrochemical cells. A plurality of channels may be present so as to spread out the compressive forces generated during operation. The number and design of channels is sufficient to minimize edge-stress forces that exceed the fatigue strength of the seals. The locations of the channels are chosen so as to spread out the compressive forces generated during operation. The channels may be spread out evenly through the stack to better handle the stresses. The channels may have a cross-sectional size of about 2 mm or greater, about 4 mm or greater or about 6 mm or greater. The upper limit on the cross-sectional size of the channels is practicality, if the size is too large the efficiency of the assemblies is reduced. The channels may have a cross-sectional size of about 12 mm or less or about 10 mm or less.

Located in at least some of the channels are posts which perform one or more of the following functions: hold the stack of components together in a fashion such that damage to components or breaking of the seal between the edges of the components of the stack is prevented, ensure uniform compression across the separator material, and ensure uniform thickness of the separator material. The posts may have on each end an overlapping portion which engages the outside surface of the monopolar end plates. This overlapping portion functions to apply pressure on the outside surface of the monopolar end plates in a manner so as to prevent damage to components or breaking of the seal between the edges of the components of the stack, and prevent bulging or other displacements of the stack during battery operation. The overlapping portion is in contact with a sealing surface, the portion of the end plate in contact with the overlapping portion. The stack may have a separate structural or protective end-piece over the monopolar endplate and the overlapping portion will be in contact in with the outside surface of the structural or protective end-piece. The overlapping portion can be any structure that in conjunction with the post prevents damage to components or breaking of the seal between the edges of the components of the stack. Exemplary overlapping portions include bolt heads, nuts, molded heads, brads, cotter pins, shaft collars and the like. The posts are of a length to pass through the entire stack and such length varies based on the desired capacity of the battery. The posts may exhibit a cross-section shape and size so as to fill the channel. The posts may have a cross-sectional size greater than the cross-sectional size of the channels so that the posts form an interference fit in the channels. The number of posts is chosen to support the end plate and edges of the substrates to prevent leakage of electrolytes and gasses evolved during operation and to prevent the compressive forces arising during operation from damaging components and the seal for the individual electrochemical cells, and to minimize edge-stress forces that exceed the fatigue strength of the seals. The plurality of posts may be present so as to spread out the compressive forces generated during operation. There may be fewer posts than channels where one or more of the channels are utilized as cooling channels or vent/fill channels. The posts may comprise any material that performs the necessary functions. If the post is utilized to seal the channels then the material used is selected to withstand the operating conditions of the cells, will not corrode when exposed to the electrolyte and can withstand the temperatures and pressures generated during operation of the cells. Where the posts perform the sealing function the posts may comprise a polymeric or ceramic material that can with stand the conditions recited. In this embodiment the material must be non-conductive to prevent shorting out of the cells. The posts may comprise a polymeric material such as a thermoset polymer or a thermoplastic material. The posts may comprise a thermoplastic material. Exemplary thermoplastic materials include ABS (acrylonitrile-butadiene-styrene copolymers), polypropylene, polyester, thermoplastic polyurethanes, polyolefins, compounded thermoplastic resins, polycarbonates and the like. ABS is most preferred. Where the channels are separately sealed the posts can comprise any material that has the structural integrity to perform the desired functions. The polymeric materials recited above, ceramics and metals may be utilized. Suitable metals may be steel, brass aluminum, copper and the like. The posts can comprise molded posts, threaded posts or posts with one or more end attachments. The posts may be bonded to parts of the stacks, for example the substrates, inserts or bosses in the channels, and the like. The bonds can be formed from adhesives or fusion of the polymeric materials, such as thermoplastic materials. Where the parts are threaded the structural parts of the stack are threaded to receive the threaded posts. Posts can have a head on one end and a nut, hole for a brad or cotter pin on the other or may have a nut, hole for a brad or cotter pin on both ends. This is generally the case for non-molded posts. The posts may be constructed in such a way as to be a one way ratcheting device that allows shortening, but not lengthening. Such a post would be put in place, then as the stack is compressed, the post is shortened so that it maintains the pressure on the stack. The post in this embodiment may have ridges that facilitate the ratcheting so as to allow the posts to function as one part of a zip tie like structure. Matching nuts and/or washers may be used with posts so as to compress the plates they are adjacent to when in place. The nuts and/or washers go one way over the posts and ridges may be present to prevent the nuts and/or washers from moving the other direction along the posts. In use the holes in the posts will have the appropriate brads, cotter pins and the like to perform the recited function. If the post is molded is can be molded separately or in place. If molded in place, in situ, a seal needs to be present in the channel to hold the molten plastic in place. A nonconductive post which is threaded may be used and can provide the necessary seal. Alternatively a pre-molded nonconductive polymeric post may be designed to form an interference fit in the channel in a manner so as seal the channels. The posts may be formed in place by molding, such as by injection molding.

When assembled the stack of components, including the bipolar and monopolar plates, form sealed electrochemical cells. Located in the sealed cells is a liquid electrolyte. The electrolyte can be any liquid electrolyte that facilitates an electrochemical reaction with the anode and cathode utilized. The electrolyte allows electrons and ions to flow between the anode and cathode. The electrolytes can be water based or organic based. The organic based electrolytes useful herein comprises an electrolyte salt dissolved in an organic solvent. In lithium ion secondary batteries, it is required that lithium be contained in the electrolyte salt. For the lithium-containing electrolyte salt, for instance, use may be made of $LiPF_6$, $LiClO_4$, $LiBF_4$, $LiAsF_6$, $LiSO_3CF_3$ and $LiN(CF_3SO_2)_2$. These electrolyte salts may be used alone or in combination of two or more. The organic solvent should be compatible with the separator, cathode and anode and the electrolyte salt. It is preferable to use an organic solvent that does not decompose even when high voltage is applied thereto. For instance, it is preferable to use carbonates such as ethylene carbonate (EC), propylene carbonate (PC), butylene carbonate, dimethyl carbonate (DMC), diethyl carbonate and ethyl methyl carbonate; cyclic ethers such as tetrahydrofuran (THF) and 2-methyltetrahydrofuran; cyclic esters such as 1,3-dioxolane and 4-methyldioxolane; lactones such as y-butyrolactone; sulfolane; 3-methylsulfolane; dimethoxyethane, diethoxyethane, ethoxymethoxymethane and ethyldiglyme. These solvents may be used alone or in combination of two or more. The concentration of the electrolyte in the liquid electrolyte should preferably be 0.3 to 5 mol/l. Usually, the electrolyte shows the highest conductivity in the vicinity of 1 mol/l. The liquid electrolyte should preferably account for 30 to 70 percent by weight, and especially 40 to 60 percent by weight of the electrolyte. Aqueous electrolytes comprise acids or salts in water which enhance the functioning of the cell. Preferred salts and acids include sulfuric acid, sodium sulfate or potassium sulfate salts. The salt or acid is present in a sufficient amount to facilitate the operation of the cell. The concentration may be about 0.5 weight percent of greater based on the weight of the electrolyte, about 1.0 or greater or about 1.5 weight percent or greater. A preferred electrolyte in a lead acid battery is sulfuric acid in water.

The articles may comprise a seal between the transverse channels and the post. The seal may be located in the channel, about the exterior of the channel or both. The seal may comprise any material or form that prevents electrolyte and gasses evolved during operation from leaking from the electrochemical cells. The seal can be a membrane, sleeve or series of matched inserts and/or bosses in the plates and/or separators or inserted in the channel. The membrane can be elastomeric. The channel can be formed by a series of sleeves, bushings, inserts and/or bosses, inserted or integrated into the plates and/or separators. The inserts may be compressible or capable of interlocking with one another to form a leak proof seal along the channel. The inserts may be formed in place in the battery plates and/or separators, such as by molding them in place. The inserts may be molded in place by injection molding. The seal can be prepared from any material that can withstand exposure to the electrolyte, operating conditions of the electrochemical cells and forces exerted by inserting the post or by the post in the channel. The preferred polymeric materials that are described as useful for the posts and the substrates. The seal may be formed by sleeves, inserts or bushings placed between the bipolar and monopolar plates. The sleeves or inserts can relatively rigid and the bushings will generally be elastomeric. The inserts, bosses, sleeves and\or bushings may be adapted to fit within indentations in the bipolar and monopolar plates and/or separators or to have ends that insert into the holes of the plates creating the transverse channels. The dual polar, bipolar and monopolar plates can be formed or machined to contain matching indents for the bosses, inserts, sleeves and/or the bushings. Assembly of the stack of plates with the bosses, inserts, sleeves or bushings may create interference fits to effectively seal the channels. Alternatively the bosses, inserts, sleeves and/or bushings may be melt bonded or adhesively bonded to the plates so as from a seal at the junction. Alternatively the bosses, inserts, sleeves and/or bushings may be coated in the inside with a coating which functions to seal the channel. As mentioned above the posts can function to seal the channels. It is contemplated that a combination of these sealing solutions may be utilized in single channel or in different channels. The components of the stack of plates, including dual polar, monopolar plates and bipolar plates, preferably have the same shape and common edges. This facilitates sealing of the edges. Where separators are present they generally have a similar structure as the battery plates to accommodate the formation or creation of the transverse channels. In another embodiment the seal may be a thermoset polymer, such as an epoxy, polyurethane or acrylic polymer injected between the bolt and the transverse channel. The sealing surface of the plate may be modified to improve sealing when compression is applied by the posts. The sealing surface may be smoothed, contoured, roughened or surface treated. A smooth surface will have large contact area from which to make an electrolyte tight seal without defects that allow liquid flow. Contours such as concentric ring(s), ridge(s) or undulations cause areas or "rings" of high pressure contact to resist the flow of liquid electrolyte. The ridge may be filled with a gasket material such as a deformable flat sheet or o-ring to facilitate liquid sealing. Rough sealing surfaces of a deformable material can compress to form reliable liquid electrolyte seal. Surface treating the sealing surface to make it incompatible to wetting by the liquid electrolyte will prevent liquid electrolyte flow into the channel. If a hydrophilic electrolyte is used the sealing surface can be made hydrophobic. Likewise, if a hydrophobic electrolyte is used the sealing surface should be hydrophilic. The channels may be formed by bosses, sleeves or bushings bonded to or in holes in the battery plates and inserts integral to the holes in the separators, for example absorbent glass mats, wherein the holes in the battery plates, inserts integrated in the holes of the separators and the bosses, sleeves or bushings are aligned to form the channels. The posts in a plurality of the channels may apply sufficient pressure to hold the inserts, holes, bosses, sleeves and/or bushings in place to form a sealed passage. The channels may be formed from bosses bonded to the battery plates and inserts integrated into the separators. The posts may be bonded to the inserts, bosses and/or substrates of the battery by an adhesive bond or by fusion of thermoplastic polymers or both. The inserts may be inserted in battery plates or separators by interference fit or bonded in place by an adhesive. Inserts in the separators may contain vent holes that allow communication between the electrochemical cells and the channels formed. The vent holes may allow transmission of gasses from the electrochemical cells to the channel and prevent the transmission of liquids from the electrochemical cells to the channels.

The edges of the battery plates and the separator plates are sealed to prevent leakage of the electrolyte and evolved gasses from the cells and isolate the individual cells to prevent short circuiting of the cells. The edges can be sealed using any known battery sealing method. The edges of the assembly may be sealed using the endo or exoskeleton sealing systems disclosed in commonly owned patent application, Shaffer, I I et al. Bipolar Battery Assembly, US 23010/0183920 A1 incorporated its entirety herein by reference. The sealing system disclosed in Shaffer, I I et al. contemplates unique structures for a bipolar battery laminate structure, such as structures described above. The structures, whether from the above methods or not, generally comprise a first separator frame; a negative pasting frame member having one or more edges and a supporting grid structure extending between the one or more negative pasting frame edges; a negative current collector foil; a substrate having a plurality of openings formed therein; a positive current collector foil; a positive pasting frame member having one or more edges and a supporting grid structure extending between the one or more positive pasting frame edges and a second separator frame. The first separator frame may include one or more edges. The negative pasting frame member may have one or more edges so that at least one edge of the negative pasting frame member is in planar contact with at least one edge of the separator frame. The substrate may also have one or more edges so that at least one edge of the substrate is in planar contact with at least one edge of the negative pasting frame member. The positive pasting frame member may have one or more edges so that at least one edge of the positive pasting frame member is in planar contact with at least one edge of the substrate. The second separator frame may have one or more edges so that at least one edge of the separator frame is in planar contact with at least one edge of the positive pasting frame member. The planar contact of the edges of the separator frames, the negative and positive pasting frame members and the substrate form an external seal on the battery so that an electrolyte introduced therein will not leak from within the battery. The edges of the pasting frame members may further include openings for receiving alignment pins or support members located on the edges of the separator frames. The locating of the alignment pins into the openings on the pasting frame members may further facilitate the forming of the external seal. It also is envisioned that a frame structure may be used by which one or more separator frames and one or more pasting frames, in combination with the substrate, will each lie in planar contact with adjacent frames and/or substrates so that the internal structure of the battery cell creates an external seal that prevents any liquid or gas (air) from escaping the battery. The edges of the pasting frame members may further include openings for receiving alignment pins or support members located on the edges of the separator frames. The locating of the alignment pins into the openings on the pasting frame members may further facilitate the forming of the external seal. Thus, any electrolyte introduced into the battery will be securely maintained without risk of battery leakage and subsequent battery failure. Further, no heavy end plates or external support structures are required to effectively seal the battery. As mentioned above, the pasting frame members may further include support members (e.g., pins) located between the edges of the pasting frame members. The use of support members is just one approach to address the issue of compressive stress and resulting unwanted edge/peeling stress within the battery. These stresses may lead to undesirable battery leakage as discussed above. This use of the support pins within a battery, and the resulting internal approach discussed herein, may therefore be referred to as building a bipolar battery having an endo-skeleton. A feature of using the endo-skeleton build or construction approach (as compared to using an exo-skeleton build approach) to address the undesired effects of compressive stress within the battery, is that it does not result in a reduction of volumetric energy density. Additionally, it is a lightweight approach, using only a few lightweight pins with very little loss of active material. Further, the endo-skeleton build approach has been found to greatly reduce the chances of traditional bipolar battery failure mode caused by edge peeling. Further, if desired, one can add pins on the perimeter or edge of the frame members to align the separating frame member, thereby allowing it to glide up and down or back and forth during compression. If desired, the bipolar battery may be constructed using a combination of an endo-skeleton and exo-skeleton build approach. For example, the bipolar battery can be constructed using internal support pins as described above. In addition to this, a frame structure may also be placed on the terminal side of the monopole. This exterior battery construction may be reinforced with an end cover as part of an aesthetic box. The combined features of an endo-skeleton and an exo-skeleton in such a construction work together to further reduce maximum edge stress and displacement. The bipolar battery may also be substantially free of any exo-skeleton structure. In one embodiment the substrates for the battery plates can have a raised edge about the periphery of the substrates which function as pasting frames for the cavity containing the electrolyte, and optional separator, to seal against one another and to seal to an outside membrane when utilized.

The edges of the stack of monopolar and bipolar plates may have adhered to a membrane. The membrane may be bonded to the edge of the plates by any means that seals the edges of the plate and isolate the electrochemical cells. Exemplary bonding methods comprise adhesive bonding, melt bonding, vibration welding, RF welding, and microwave welding among others. The membrane is a sheet of a polymeric material which material can seal the edges of the monopolar and bipolar plates and can withstand exposure to the electrolyte and the conditions the battery is exposed to internally and externally. The same materials useful for the substrate of the bipolar plates may be utilized for the membrane. The membrane may be a thermoplastic polymer that can be melt bonded, vibration welded or molded about the substrates of the monopolar and bipolar plates. The same thermoplastic polymer may be utilized for the monopolar and bipolar substrates and the membranes. Exemplary materials are polyethylene, polypropylene, ABS and, polyester, with ABS most preferred. The membranes may be the size of the side of the stacks to which they are bonded and the membranes are bonded to each side of the stack. The edges of the adjacent membranes may be sealed. The edges can be sealed using adhesives, melt bonding or a molding process. The membranes may comprise a single unitary sheet which is wrapped about the entire periphery of the stack. The leading edge of the membrane, first edge contacted with the stack, and the trailing edge of the stack, end of the membrane sheet applied, are may be bonded to one another to complete the seal. This may be performed by use of an adhesive, by melt bonding or a molding process. In melt bonding the surface of the membrane and/or the edge of the stack are exposed to conditions at which the surface of one or both becomes molten and then the membrane and the edge of the stack are contacted while the surfaces are molten. The membrane and edge of the stack bond as the surface freezes forming a bond capable of sealing the components together. The membrane may be taken from a continuous sheet of the membrane material and cut to the desired length. The width of the membrane may match the height of the stacks of monopolar and bipolar plates. The membrane has sufficient thickness to seal the edges of the stack of monopolar and bipolar sheets to isolate the cells. The membrane may also function as a protective case surrounding the edges of the stack. The membrane may have a thickness of about 1 mm or greater, about 1.6 mm or greater or about 2 mm or greater. The membrane may have a thickness of about 5 mm or less, 4 mm or less or about 2.5 mm or less. When the membrane is bonded to the edge of the stack, any adhesive which can withstand exposure to the electrolyte and the conditions of operation of the cell may be used. Exemplary adhesives are plastic cements, epoxies, cyanoacrylate glues or acrylate resins. Alternatively, the membrane may be formed by molding a thermoplastic or thermoset material about a portion of, or all of, the stack of battery plates. Any known molding method may be used including thermoforming, reaction injection molding, injection molding, roto molding, blow molding, compression molding and the like. The membrane may be formed by injection molding the membrane about a portion of or all of the stack of battery plates. Where the membrane is formed about a portion of the stack of the plates it may be formed about the edges of the battery plates or battery plates and the separator.

The sealed stack may be placed in a case to protect the formed battery. Alternatively the membrane in conjunction with a protective covering over the monopolar plates at the end of the stack may be used as a case for the battery. The monopolar plates may have an appropriate protective cover attached or bonded to the surface opposite the anode or cathode. The cover may be the same material as the membrane or a material that can be adhesively bonded or melt bonded to the membrane and can have a thickness within the range recited for the membranes. If affixed to the end of the plates the cover can be affixed with any mechanical attachment including the posts having overlapping portions. The case may be formed by molding a membrane about the stacks of battery plates and/or the opposite sides of the monopolar plates.

The assemblies may further comprise one or more conductive conduits adapted to transmit electrons from the current collectors in contact with the cathodes to one or more positive terminals. A typical bipolar battery flows electrons from cell to cell through the substrate. Either the substrate at least partially comprises a conductive material or comprises conductive pathways through the substrate. When the circuit is closed that contains the cells electrons flow from cell to cell through the substrate to the positive terminal. It is contemplated that the assemblies may flow electrons through the substrates and cell, through a current collector to a current conductor or both. The assemblies disclosed further have conductive conduits which contact the current collectors or current conductors in contact with the anodes to the negative terminals. In the batteries disclosed herein having two or more stacks, each stack has a current conductor and/or a conductive conduit contacting the current collectors in contact with the anodes with a negative terminal and a current conductor and/or a conductive conduit contacting the current collectors in contact with the cathodes with a positive terminal. The conductive conduits from the two or more stacks may be arranged in parallel or in series. Parallel circuits comprise two or more circuits that are not connected to one another. Series circuits comprise two or more circuits that are arranged such that electrons flow through the circuits sequentially. When the conductive conduits are arranged in a series configuration the battery may have only one negative terminal and one positive terminal. When the conductive conduits are arranged in a parallel manner the battery may have single positive and negative terminals in which each circuit connects with each of the negative or positive terminals. Alternatively each circuit may have separate negative and positive terminals. The terminals may be connected to the load which typically utilizes the electricity stored in the battery. Each of the current conductors and/or current conduits in contact with current collectors in contact with cathodes in a parallel arrangement may be contacted with separate positive terminals. Each of the current conductors and/or current conduits in contact with current collectors in contact with anodes in a parallel arrangement may be contacted with separate negative terminals. The individual terminals may be covered by a membrane leaving only a single connected positive and negative terminal exposed wherein the covered negative terminals are connected with the exposed negative terminal and the covered positive terminals are connected with the exposed positive terminal.

The assembly may contain one or more pairs of conductive terminals, each pair connected to a positive and negative terminal. The terminals are adapted to connect each battery stack to a load, in essence a system that utilizes the electricity generated in the cell. The terminals are in contact with the conductive conduits in the assemblies. The assembly may contain pressure release valves for one or more of the cells to release pressure if the cell reaches a dangerous internal pressure. The pressure release valves are designed to prevent catastrophic failure in a manner which damages the system the battery is used with. Once a pressure release valve is released the battery is no longer functional. The assemblies disclosed may contain a single check valve which releases pressure from the entire assembly when or before a dangerous pressure is reached.

The assemblies disclosed are attached to a load and a circuit is formed which includes the cells. Electrons are flowed to the terminals and to the load, a system using the electricity. This flow is maintained as long as the cells can generate electricity. If the stack of cells becomes fully discharged the battery needs to undergo a charging step before additional use. If the substrate for the bipolar plates contains an electrically conductive material admixture at an operating temperature of the battery assembly that is below its phase transformation temperature, the substrate has an electrically conductive path via the material admixture, between a first surface and an opposing second surface of the substrate, and at a temperature that is above the phase transformation temperature of the conductive material admixture, the electrically conductive material admixture undergoes a phase transformation that disables electrical conductivity via the electrically conductive path. This allows the disabling of the battery before untoward consequences occur. Once a battery is discharged it may be recharged by forming a circuit with a source of electrons. During charging the electrodes change function and the anodes during discharge become cathodes and the cathodes during discharge become anodes. In essence the electrochemical cells flow electrons and ions in opposite directions as compared to discharge.

The assembly disclosed may be prepared by the following steps. The substrates for the bipolar plates, dual polar plates and monopolar plates are formed or cut to shape. If the substrate comprises a nonconductive material and a traditional bipolar battery is being assembled, the substrate needs to be converted to a composite substrate. Means of achieving this is by forming holes through the substrate by any known means, such as molding them in or machining the substrate to from the holes. The openings are filled with conductive material, preferably conductive material that melts at a defined temperature as described hereinbefore. If utilized the metal sheets, screens, wires or foil are adhered to one or both of the faces of the substrate. Preferably the metal sheets or foil are bonded to the substrate using an adhesive as described hereinbefore, preferably a nitrile based rubber cement. The cathode and anode are attached to the substrate or the metal sheets, screens, wires or foil. The attachment is facilitated using any standard cathode or anode attachment method. Where the cathode and anode are used in a paste form, the paste is applied to the substrate or to the metal sheet, screen, wire or foil. The paste is allowed to dry. The holes for the transverse channels may be pre-formed or machined into the substrate, metal sheets or foil, separator, anode, cathode and any other component present. Where the channels are formed using sleeves, inserts or bosses and the like, they are inserted into the battery plates and/or the separators. Where the inserts are molded in place they are molded in place using known molding processes. The components are then stacked such that for each plate an anode faces a cathode of another plate. Preferably the sheets are stacked so that the edges of the substrates are aligned along with the edges of any other frame components. In one embodiment a plate with two or more guide pins or bolts is used to support the stack. The components are stacked on the plate with the guide pins in an appropriate order consistent with the disclosure herein. Two or more of the transverse channels may be used for the alignment pins or bolts. Once the stack is completed, elastomeric membranes or sleeves may be inserted into the transverse channels. If the channel is sealed with bushings, inserts or plastic sleeves located between the holes in the plates a coating may be applied to the interior of the channel, interior of the holes, sleeves inserts and/or bushings. If the interior of the holes of the plates need to be threaded they are threaded either prior to assembly or after assembly using known techniques. Thereafter posts are inserted into the stack and secured by the overlapping portion to the sealing surface of the opposing side of the monopolar plates. Where the overlapping portion is a mechanical attachment structure, such attachment structure is secured to the post. Where the post is injection molded in place, molten thermoplastic material is inserted into the channels and an overlapping portion of the molten material is formed on the sealing surfaces at both ends. The surface of the channels may be heated to melt the surface of the inside of the channels, in this embodiment the injected thermoplastic material bonds well to the inside of the channel. The thermoplastic material is allowed to cool. In another embodiment the channel may have a form inserted into the channels and a form for the overlapping portion of the formed at each end. A two-part thermoset material is then added to the channels and allowed to cure to form the post. Where the post is designed to fit into the channel by interference fit the post is inserted with appropriate force. Once the posts are secured and stable, the stack is removed from the guide pins and posts can be inserted into the channels used for the guide pins.

Where a membrane is applied to the edge surface of the stack, an adhesive is applied to either or both of the membrane or the edge of the stack and the membrane and the edge of the stack are contacted so as to bond them together. The membrane may be held in place while the adhesive sets or cures using known mechanical means. The edges of the membrane can be sealed to the unsealed edges of other membrane sheets or membranes or end plates on the opposite surface of the monopolar plates. The sealing can be performed by an adhesive or by melt bonding. Alternatively the membrane can be attached by melt bonding. In melt bonding both the edge of the stack and the surface of the membrane to be bonded to the edge are exposed to conditions such that the surface melts without negatively impacting the structural integrity of the membrane or the stack. This can be achieved by contacting each with a hot surface, platen, hot fluid, air, radiation, vibration and the like, then contacting the membrane and edge of the stack along the melted surface and allowing the molten surfaces to cool and bond together. The membrane may be cut to fit a particular edge or can be a continuous sheet which is wrapped around the edge of the stack. In this embodiment the leading edge and the trailing edge of the membrane are bonded together where they meet, preferably by melt bonding. The membrane may be sealed to the membrane or endplate on the outside surface of the monopolar plates, where present. Where a case is used the assembly may be inserted into case. Preferably the membrane functions as a case. In the melt bonding embodiment, the membrane and edge of the stack are exposed to a temperature or condition at which the surface of each is melted, becomes molten, for a time sufficient to melt the surface of each. The temperature chosen is preferably above the melting temperature of the material used in the membrane and/or the substrate and any other structural components. Preferably the temperature used is about 200° C. or greater, more preferably about 220° C. or greater and most preferably about 230° C. or greater. Preferably the temperature used is about 300° C. or less, more preferably about 270° C. or less and most preferably about 240° C. or less.

The frames and/or inserts may be molded into or onto the separators or the battery plate substrates using the following steps. The separator sheets are cut to size (die punch, slit, stamped, etc). One or more sheets are stacked to meet the required thickness. The sheets are placed into a mold that places the sheets into a fixed position. The mold forms the periphery frame around the separator and any internal features about the transverse channels (e.g. bushings) as required. Further the mold is designed to not overly compress the separator material and to prevent plastic from damaging the separator material. Plastic is the injected into the mold and once the plastic is cooled the part is ejected.

The membrane may be molded about a portion of or all of the battery stacks utilizing the following steps. Components of the battery are stacked in appropriate order (end plate, monopolar plate, separator, bipolar plate, etc). The stack alignment can be assured by using the guide rods through the transverse holes of each stacked component. The stacked assembly is then transferred into the mold which consists of a positive mold cavity, a negative mold cavity, an insert mold cavity for the body of the battery (alternatively slide doors could be used as is common in injection molding) and retractable guide pins located in either the negative mold cavity or the positive mold cavity. The stacked assembly is transferred onto the retractable guide pins to ensure and maintain alignment. The mold is then closed which compresses the assembly. Plastic is then injected to form the outer membrane of the battery sealing to the components and end plates. The guide pins are then retracted and a second shot of plastic is injected filling the transverse channels and securing the injected plastic to the end plates. Once cooled the battery is ejected from the mold.

The assembly may further comprise one or more vent holes leading into one or more of the electrochemical cells. The vent holes allow gasses to vent from the electrochemical cells and electrolyte liquids to be introduced to electrochemical cells with either pressure applied to move the liquid into the cells or a vacuum pulled on the electrochemical cells to pull the electrolyte through the vent holes into the cells. In the embodiments where electrolyte is introduced using a vacuum, each cell may have two vent holes wherein a vacuum is applied to one vent hole so as to pull electrolyte into the cells from the other vent hole. The vent holes may be in contact with any combination of manifolds and channels. A vent hole may be in contact with each electrochemical cell. The vent holes may be in contact with the battery separators for each cell. The assembly may comprise a manifold. The one or more vent holes may be in contact with the manifold and the manifold may form a common head space for all of the vent holes. The manifold has one or more ports formed therein where one or more valves, such as a check valve, may be placed in the manifold ports. The battery may further comprise a fill valve. The fill valve may be located in the manifold or connected to a transverse channel. The article may further comprise one or more integrated filling and/or venting channels. Such a channel is formed near the center of a battery stack and is in communication with the area between the cathode and anode where the separator is located, this is the area that forms the electrochemical cell when electrolyte is added to the area. The channels can be formed by forming holes or slots in the separators and battery plates before assembly and then aligning the holes or slots. Inserts, sleeves or bosses may be used as discussed herein with respect to the transverse channels as long as the channels communicate with the area adapted for use as electrochemical cells. Preferably the channels communicate with the outside of the battery stack in two places. This facilitates filling of the battery with electrolyte. After filling of the electrochemical cells with electrolyte one of the openings can be filled or closed. The other opening is used to vent the battery and the electrochemical cells. During filling a vacuum is pulled on one external hole and electrolyte is drawn in through the other hole. Alternatively a single hole is used and the electrochemical cells are filled as described herein after. In this embodiment once the sealed battery is formed, a vacuum is pulled on the single hole or port to create a low pressure environment in the cells. The pressure in the electrochemical cells may be 50 Torr or less or may be 10 Torr or less. The vacuum is then disconnected and a source of electrolyte is connected to the hole or port and the electrolyte quickly fills the battery due to the low pressure in the cells. The vacuum apparatus and the source of electrolyte may be connected through a switchable valve so that switching from vacuum to the source of electrolyte can be performed in an efficient manner. This system may be utilized where one transverse channel is formed from sleeves, inserts and/or bosses having vent holes, such as notches in the bosses, inserts or sleeves, in contact with the electrochemical cells. This system allows for even filling of the electrochemical cells with fresh electrolyte. Filling under these conditions can take place in about 600 second or less or about 300 second or less. A valve, such as a check valve, pop valve, pressure relief valve and the like, may be inserted into the remaining hole after filling. The channel can be pre-threaded or tapped after assembly of the stack.

After assembly, vent holes may be drilled if necessary through the sealed membrane into each cell centrally located on the thickness of the absorbent glass mat separator. A manifold is then attached to the top of the battery assembly forming a common head space above the vent holes. In the manifold a single port may be fabricated. The single manifold port may be used as a vacuum purge port and an electrolyte fill port. Vacuum is applied to the manifold port via vacuum pump to low pressures, such as about 29 inches Hg, then the vacuum source valve is turned off, the fill valve is connected to a source of electrolyte is opened allowing electrolyte to fill all cells of the battery simultaneously. The vent holes may be formed in the frames about the separator when the frames are fabricated or molded. An integrated vent channel may be formed by predrilling or forming holes in the frames of the separators and the substrates used for the battery plates. These holes can be aligned to form a channel. This channel may communicate with the vent holes that communicate with the electrochemical cells. The integrated vent channel may be one of the transverse channels wherein the transverse channels have a vent hole communicating with each of the electrochemical cells. There may be two integrated channels with vent holes communicating with each electrochemical cell. Formation of an integrated channel can be achieved by providing a membrane or insert in the transverse channel with vent holes for each electrical chemical cell. The channel may be formed from inserts, sleeves or bosses which have vent holes or form vent holes which communicate with the electrochemical cells. The integrated channels may be pressurized to prevent backflow of electrolyte. The integrated channel may be terminated with a valve to control the internal pressure of the assembly. Before use the channel may be used to fill the electrochemical cells with electrolyte. The valve may be located on one of the end plates. The channel can be threaded after assembly or can be pre-threaded prior to assembly for insertion of a valve. The valve may be inserted and retained using any known means for insertion and retention. Some of the components used in the articles disclosed herein are adapted to be disposed adjacent to other components disclosed. Components that are designed to be located to other components may have or utilize components or techniques known in the art for retaining the parts in the appropriate relationship to one another. The particular components or techniques used to retain components in relationship to one another are selected based on the components, relationship and design preferences of the skilled artisan designing or assembling the assemblies of the invention.

The assemblies can withstand internal pressures of 10 psi or greater without leaking or warping due to the internal pressures, about 20 psi or greater, about 50 psi or greater and about 100 psi or less. The assemblies can withstand internal pressures of about 6 to about 10 psi. The assemblies may provide an energy density of about 34 watt hours per kilogram, about 40 watt hours per kilogram or about 50 watt hours per kilogram. The assemblies of the invention can generate any voltage desired, such as 6, 12, 24, 48 or 96 volts. The voltage can be higher although about 200 volts is a practical upper limit.

Figure 2:
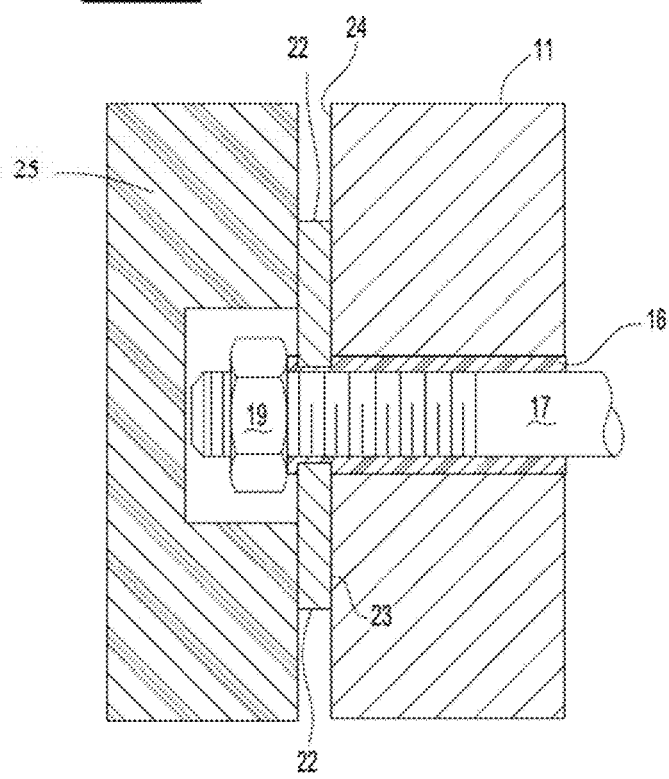
FIG. 2 is side view of an assembly disclosed having an end plate over a bolt in a transverse channel.

The following figures illustrate some embodiments of the invention. FIG. 1 shows a side view of a stack of bipolar plates 10. Shown are a number of monopolar and bipolar plate substrates 11. Adjacent to each bipolar plate substrate 11 are anodes 12 and cathodes 13. Disposed between the anodes 12 and the cathodes 13 of each cell is a separator 14 comprising an absorbent glass mat having electrolyte absorbed therein. Also shown is a channel seal 15 comprising a rubber tube disposed in a transverse channel 16. In the transverse channel 16 inside the rubber tube of the channel seal 15 is a post 17 in the form of a threaded bolt. At the end of the posts 17 are overlapping portions in the form of bolt heads 18 and nuts 19. About the edge of the substrates of the monopolar 43 and bipolar plates 44 are frames 20. FIG. 2 shows an end plate 25 disposed over the end of the opposite surface of the substrate 11 of a monopolar plate 43. A seal 22 is placed between the nut 19 on the post 17 and the sealing surface 23 on the monopolar plate opposing surface 24.

Figure 3:
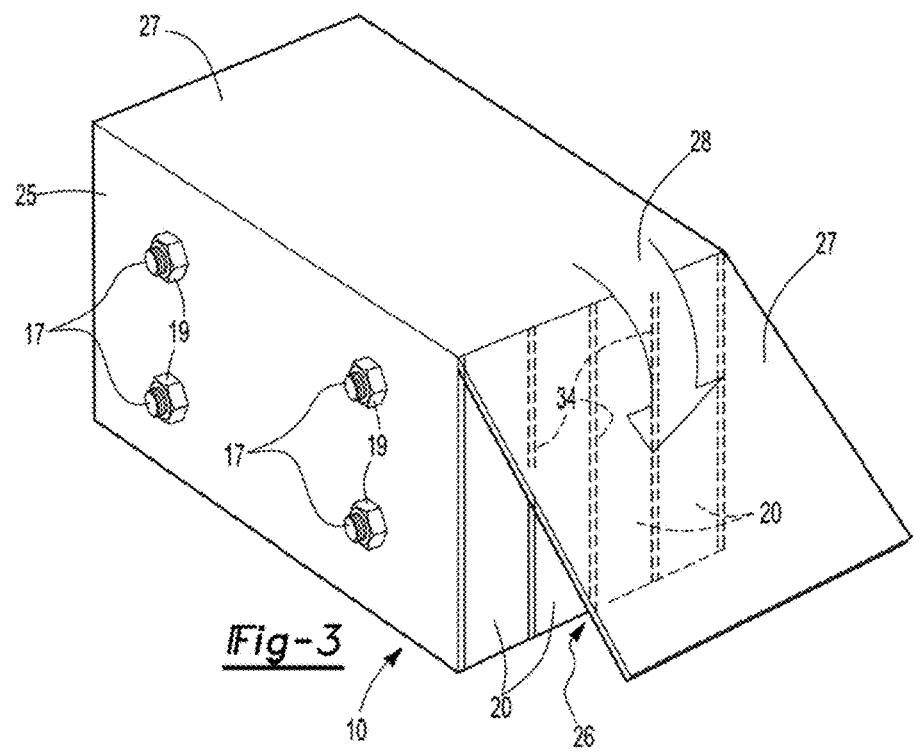
FIG. 3 is a side view of an assembly with a membrane disposed about the stack of bipolar plates.
Figure 4:
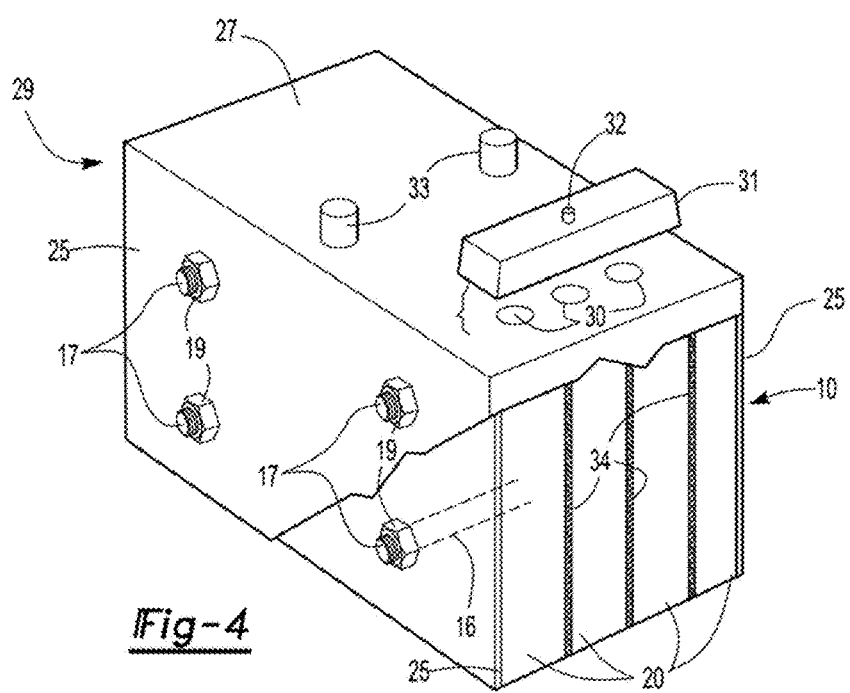
FIG. 4 shows an assembly disclosed with a manifold and a check valve.

FIG. 3 shows applying a membrane about the edge of a stack of bipolar substrates. An end plate 25 is shown with four bolt heads 19 spaced apart on the end of bolts 17. End plates 25 are shown on each end of the stack. Disposed about the substrates 11 are frames 20. Between the frames of the substrates 20 are the frames for the separators 34. A membrane 27 is being applied to the substrate frames 20 and the separator frames 34 using a source of heat 26 and pressure 28 to seal the membrane 27 to the edge of the stack of substrates frames 20 and separator frames 34. FIG. 4 shows a bipolar battery 29 comprising battery plate stack 10 having substrate frames 20 interspersed with separator frames 34. Shown are end plates 25, one showing four nuts 19 spaced apart. Also shown are vent holes 30 drilled into the cells, a manifold 31 adapted to cover the vent holes 30 and form a common head space for the vent holes 30. Also shown is a check valve 32 disposed on the manifold 31 in contact with the common head space, not shown. Also shown are two terminal posts 33 which are the negative and the positive terminals for the bipolar battery 29.

Figure 5:
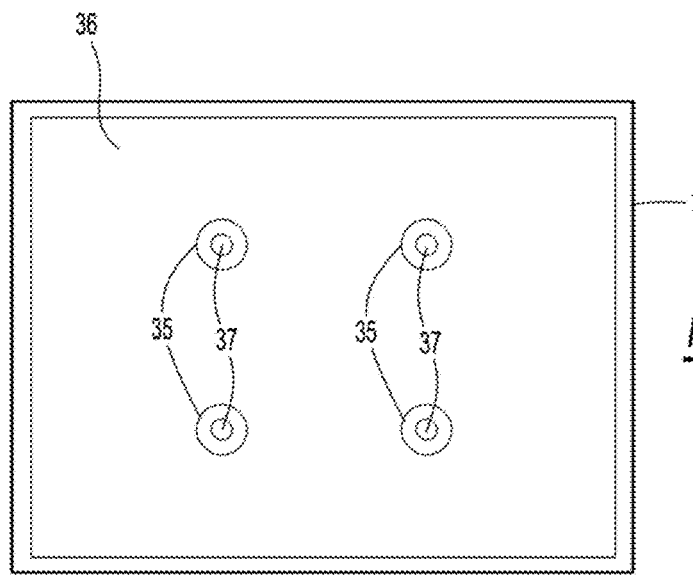
FIG. 5 illustrates a separator sheet disclosed.
Figure 6:
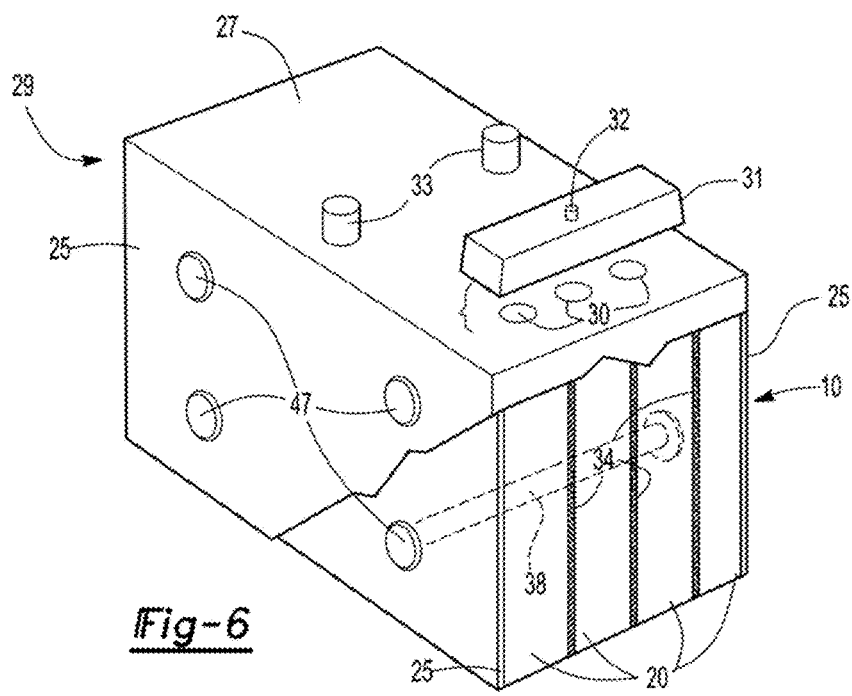
FIG. 6 illustrates another embodiment of an assembly disclosed wherein posts are injection molded into the transverse channels.
Figure 7:
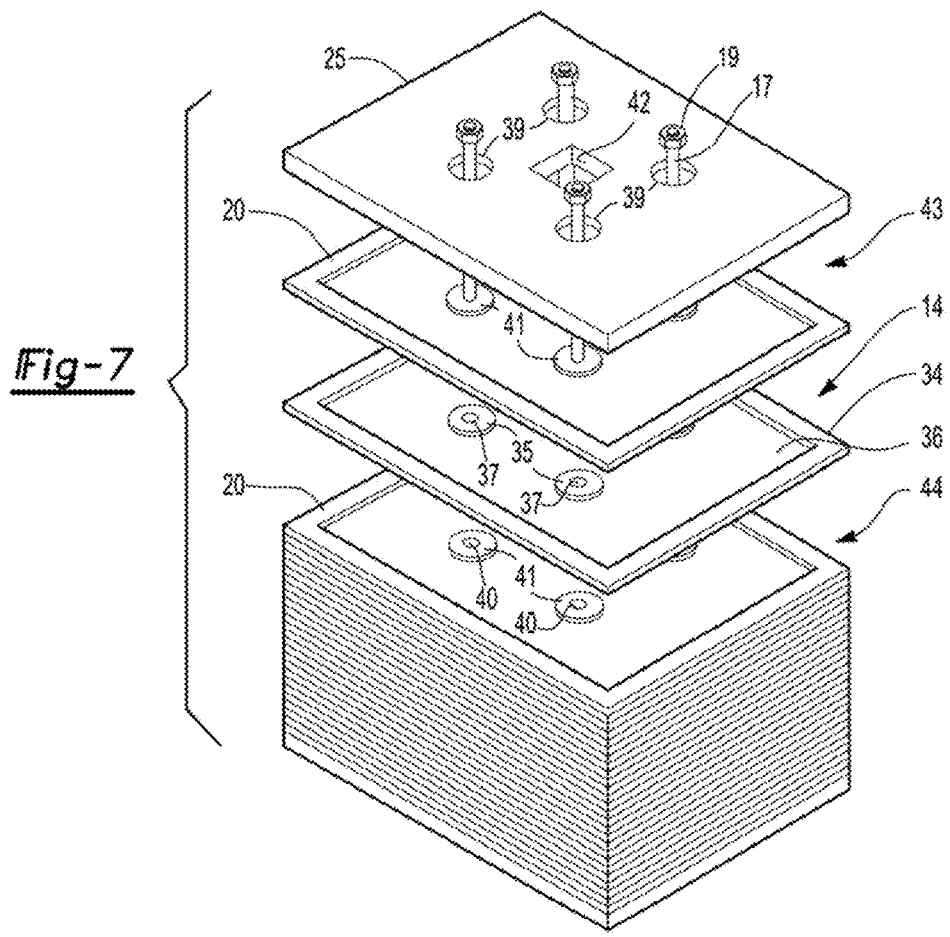
FIGS. 7 and 8 illustrates stacks of battery plates and separator plates.
Figure 8:
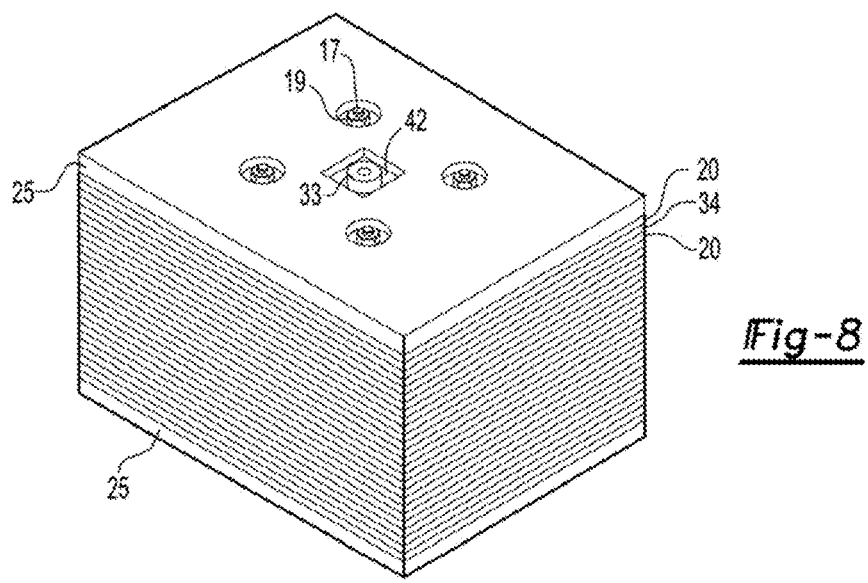

FIG. 5 shows a separator 14, a molded integrated frame 34 and four molded in inserts 35. The molded inserts 35 are located about molded insert holes 37 adapted to form part of the transverse channel 16. The frame 34 is disposed about an absorbent glass mat 36. FIG. 6 shows molded posts 38 and molded heads 47 located on the end plate 25. FIGS. 7 and 8 illustrates stacks of battery plates and separator plates. FIG. 7 shows a partially exploded stack of battery plates and separators. Shown is an end plate 25 having a terminal hole 42 and holes 39 for posts 17 in the form of bolts and nuts 19. Adjacent to the end piece is a monopolar plate 43 having a frame 20 with a raised edge. The monopolar plate 43 has raised inserts 41 that surround holes used to form the transverse channel 16 and post 17 in the holes. Adjacent to the monopolar plate 43 is a separator 14 having a frame 34 about the periphery and an adsorbent glass mat 36 comprising the central portion. Molded inserts 35 surrounding molded insert holes 37 for forming the transverse channels are shown. Adjacent to the separator 14 is a bipolar plate 44 having a frame 20 about the periphery which has a raised surface, raised inserts 41 which are raised to form the transverse channel 16. The raised inserts 41 form raised insert holes 40 for the transverse channel. FIG. 8 shows the stack of battery plates and separators. Shown are end plates 25, battery plate substrate frames 20, separator frames 34, posts 17, nuts 19 about the posts 17. A terminal hole 42 in the endplate 25 has a battery terminal 33 located therein.

Figure 9:
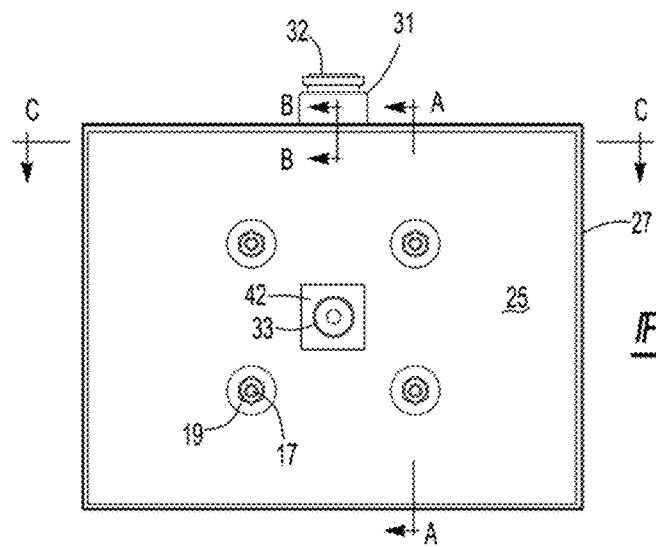
FIG. 9 shows another embodiment of an assembly disclosed.
Figure 10:
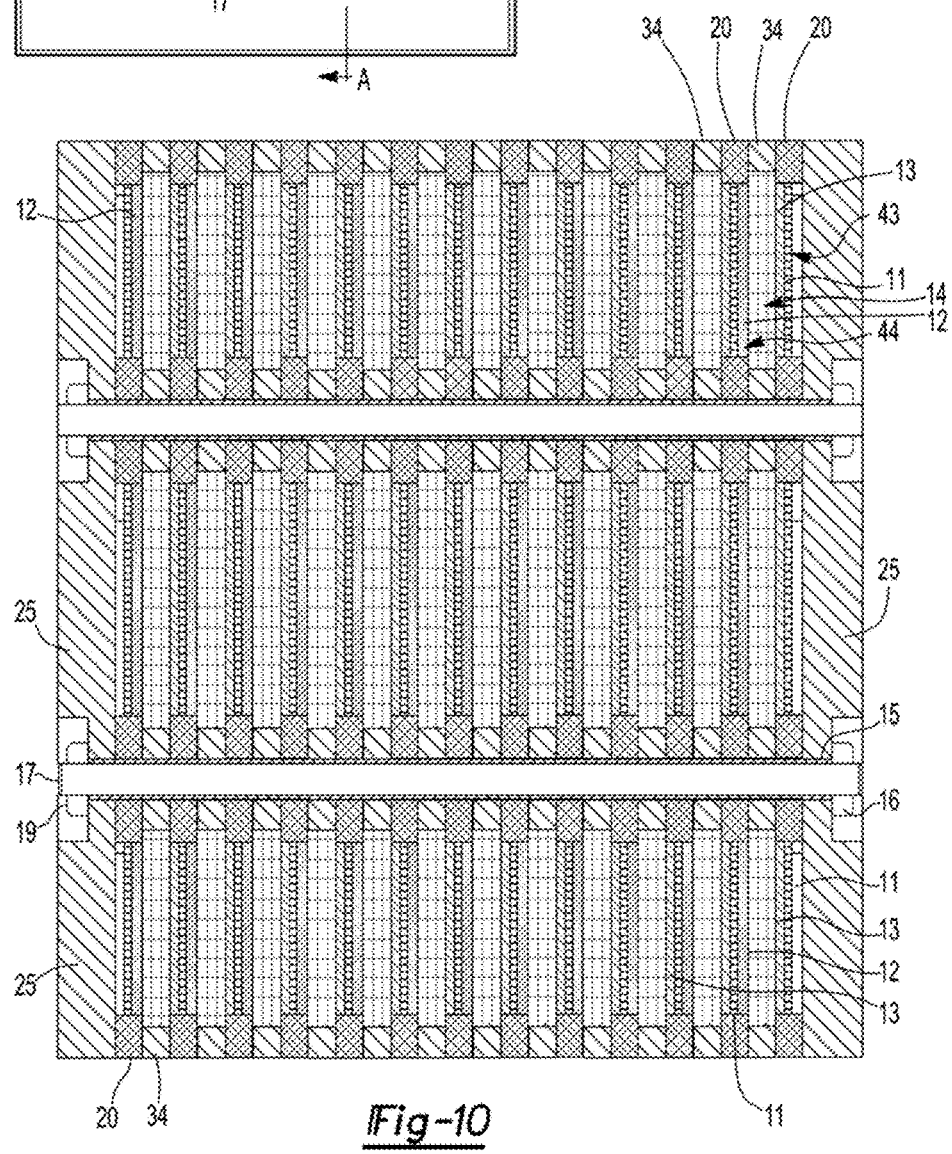
FIG. 10 shows a cutaway view of the assembly of FIG. 9 through a pair of transverse channels along plane A-A.

FIG. 9 shows another embodiment of an assembly of the invention. Shown are posts 17 and nuts 19 on the endplate 25, a terminal hole 42 with a terminal 33 located therein, a manifold 31 and a check valve 32, Disposed about the periphery of the battery is a membrane 27. FIG. 10 shows a cutaway along the plane shown by line A-A through the transverse channels. Shown is a monopolar plate 43 having a substrate 11 and a cathode 13 having a frame 20 at the ends of the substrate 11. Adjacent to the cathode 13 on the monopolar plate 43 is a separator 14 having a frame 34 on each end. Adjacent to the separator 14 is a bipolar plate 44 having an anode 12. The anode 12 is disposed on a substrate 11 and on the opposite surface of the substrate 11 is a cathode 13 and disposed at the end in this view is the frame 20. In this view there are number of bipolar plates 44 arranged as described. Between the bipolar plates 44 are separators 14. At the opposite end of the stack is a monopolar plate 43 having a substrate 11, with a frame 20 shown at the ends in this view and an anode 12 facing the adjacent separator 14. The pairs of battery plates form electrochemical cells with the separators 14 located in the cells. Also shown are the transverse channels 16 having channel seals 15 and posts 17 disposed therein and nuts 19 at the end of the posts 17. FIG. 11 shows a partial cut away view of the end of a stack of the assembly of FIG. 9 showing the vent holes along line B-B. FIG. 12 shows a cutaway view of the assembly of FIG. 9 though the vent holes 30 to the electrochemical cells along plane C-C. Shown are vent holes 30 for each electrochemical cell.

Figure 13:
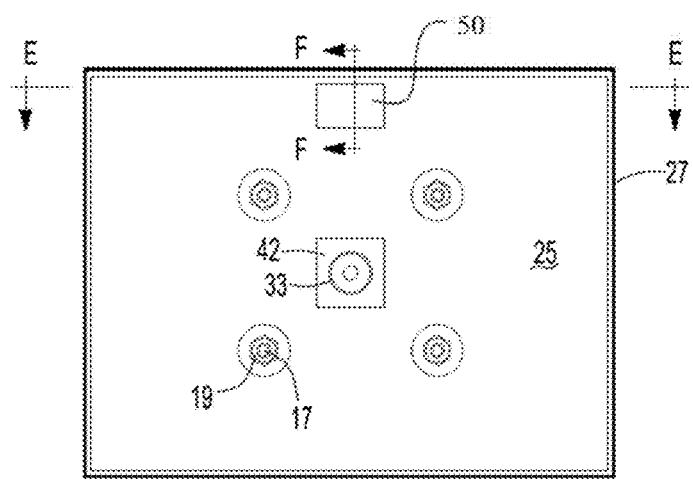
FIG. 13 shows another embodiment of an assembly disclosed with a valve in the end plate of the assembly.
Figure 14:
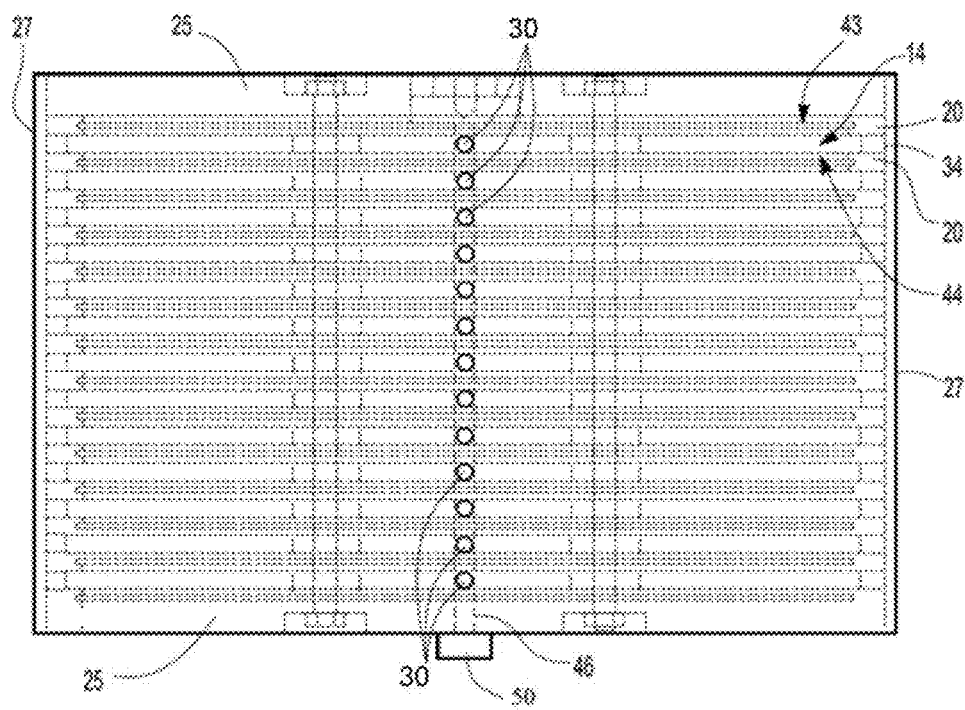
FIG. 14 shows a cutaway view of the assembly of FIG. 13 though an integrated channel in communication with the vent holes to the electrochemical cells along plane E-E.

FIG. 13 shows another embodiment of an assembly of the invention with a valve 50 in the end plate 25 of the assembly. The valve 50 communicates with an integrated channel 46. The integrated channel 46 communicates with the vent holes. FIG. 14 shows a cutaway view of the assembly of FIG. 13 with an integrated channel 46 in communication with the vent holes 45 to the electrochemical cells along plane E-E. The integrated channel 46 communicates with a valve 50 at the end of the stack. FIG. 15 shows a cutaway view of the assembly of FIG. 13 though an integrated channel 46 in communication with the vent holes 30 to the electrochemical cells along plane D-D.

FIG. 16 illustrates a separator 14 having an absorbent glass mat 36 as shown in FIGS. 5 and 7 containing a vent (vent hole) 51 in one of the molded in inserts 35 having a hole 37. The vent 51 communicates with between the hole 37 and the absorbent glass mat 36 of the separator. Also shown is the frame 34 about the separator 14. A cut out portion of FIG. 16 shows a close up of the insert 35 having a hole 37 and the vent 51 wherein the vent 51 communicates between the hole 37 and the absorbent glass mat 36 of the separator 14. FIG. 17 shows a side view of a cut out from a separator 14 having an insert 35 with a vent 51 communicating between the hole 37 and the absorbent glass mat 36. FIG. 18 shows a portion of two bipolar plates 10 with a portion of a separator 14 disposed between them. The inserts 47 in the bipolar plates and the separator 35 are aligned so that their holes 40 and 37 respectively are aligned to form a portion of a vent/fill channel 46. Also shown are the substrate plates 11, anodes 12 and cathodes 13 of the bipolar plates.

FIG. 19 shows a dual polar battery plate 61, having an anode 12 and a cathode 13 deposited on the conductive substrate plates 11. Shown is a dual polar battery plate having a nonconductive substrate 57 that prevents the flow of electrons across the plate. On each surface of nonconductive substrate 57 is a conductive substrate 60 each of which contain a current collector 59 on the opposite face, wherein the current collectors 59 are disposed between the anode 12 and the cathode 13 disposed on the conductive substrate 60. The positive current conductor 56 is disposed between the nonconductive substrate 57 and the conductive substrate 60 connected to the cathode 13. The negative current conductor 55 is disposed between the nonconductive substrate 57 and the conductive substrate 60 connected to the anode 12. Shown between the conductive substrates 60 and the anode 12 and the cathode 13 are current collectors 59.

FIG. 20 shows a bipolar battery 62 having two stacks 10 of bipolar battery plates 44, having an anode 12 and a cathode 13 deposited on conductive substrate plates 11. Shown is a dual polar battery plate 61 as described in FIG. 19 disposed between the two stacks of battery plates 10. The stacks of the battery plates 10 contain battery plates 44 as described herein. The battery stacks 10 are arranged in parallel. The negative current conductors 55 are connected by a negative current conduit 58. The outer most negative conductor 56, connected to the anodic monopolar plate 43 also functions as a negative terminal for the battery. The positive current conductors 56 are connected by a positive current conduit 62 the outer most positive conductor 56, connected to the cathodic monopolar plate 43 also functions as a positive terminal for the battery. The negative current conduit 58 connects the negative current collector 55 to the negative terminal 54 of the battery. This figure also shows monopolar plates 43 at each terminal end of the two stacks of battery plates and a membrane 27 disposed about the surface of the battery. The terminal negative current conductors 55 and positive current collectors 56 pass through the membrane 27. Not shown in this view is a transverse channel 16 having vent holes 30 in communication with the separators 14 located in the electrochemical cells which are defined by the separators 14. The terminal negative current conductors 55 and positive current collectors 56 pass through the membrane 27.

Figure 21:
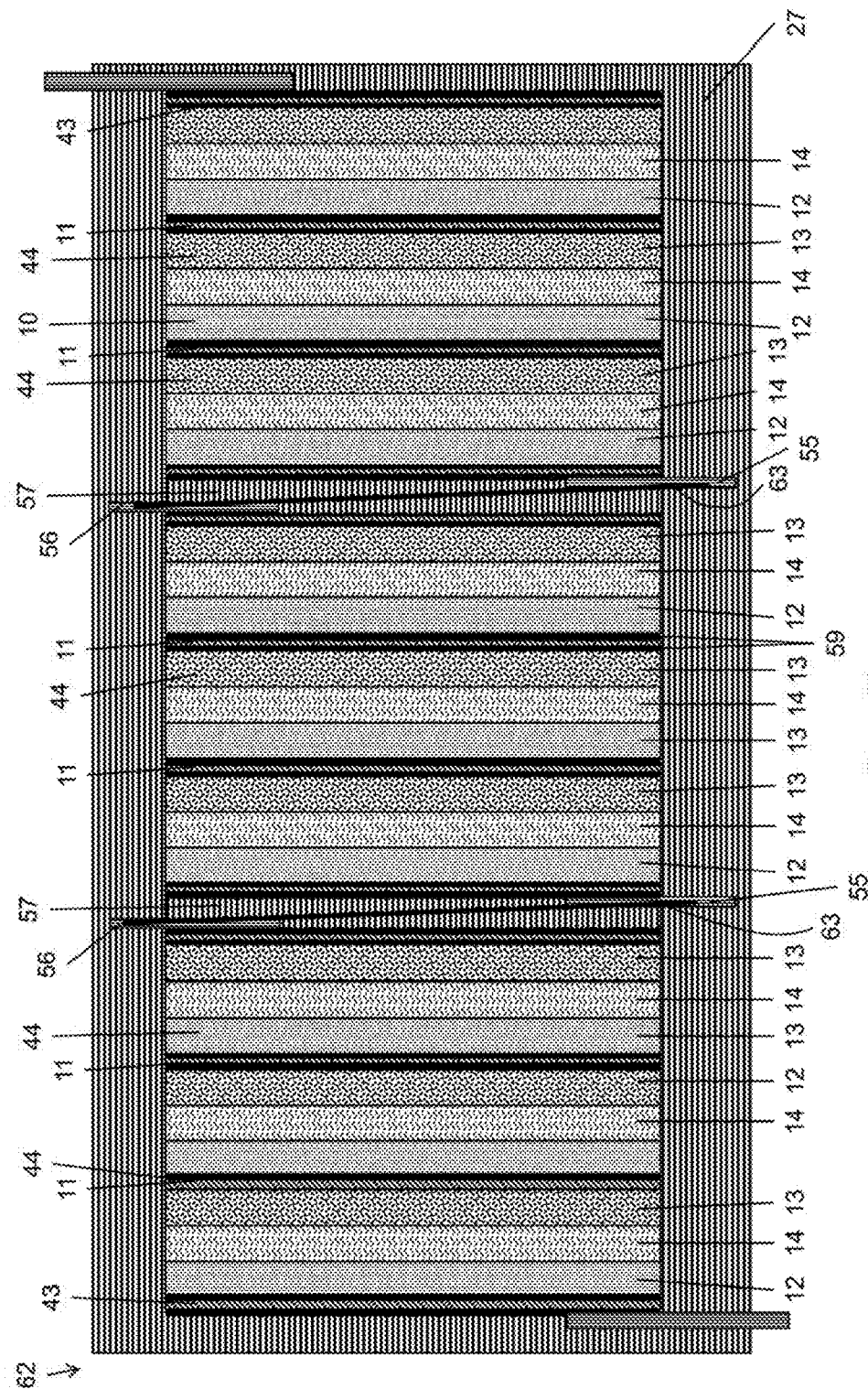
FIG. 21 shows three stacks of battery plates separated by two dual polar plates wherein the stacks are connected in series.

FIG. 21 shows a bipolar battery 62 having two stacks 10 of bipolar battery plates 44 terminated on each end with monopolar battery plates 43 having two dual polar battery plates 61 disposed between the stacks of bipolar plates 10. The stacks of bipolar plates 10 are arranged in series. The negative current conductor 55 of each dual polar plate 61 is connected by a current conduit 63 to the positive current conductor 56 of the same dual polar battery plate 61. The outer most negative conductor 55, which is in contact with the monopolar plate with an anode, also functions as a negative terminal for the battery. The outer most positive conductor 56, which is in contact with a monopolar plate with a cathode, also functions as a positive terminal for the battery.

ILLUSTRATIVE EMBODIMENTS

The following examples are provided to illustrate the invention, but are not intended to limit the scope thereof. All parts and percentages are by weight unless otherwise indicated.

Example 1

A 12V bipolar battery is built using two monopole plates (positive and negative) and 5 bipolar plates. The plates are manufactured using methods as described herein and in commonly owned patent application titled BIPOLAR BATTERY ASSEMBLY, Shaffer I I, et al. U.S. Pat. No. 8,357, 469. The plates are pasted using standard lead-acid active materials for the negative active material and positive active material. The battery is assembled using methods described herein and commonly owned patent application titled BIPOLAR BATTERY ASSEMBLY, Shaffer I I, et al. US2014/0349147. The battery uses standard absorbent glass mat separator material disposed between the positive and active material in each cell as described in the commonly owned patent application title BIPOLAR BATTERY ASSEMBLY US2014/0349147. The battery is filled with 1.305 g/cc sulfuric acid using processes described in commonly owned patent application titled BIPOLAR BATTERY ASSEMBLY US2014/0349147. The battery is formed using common formation processes for lead acid batteries. At the end of formation the battery is topped off with 1.363 g/cc sulfuric acid resulting in a nominal open cell voltage of 13.25V.

Example 2

A second battery is built using processes and materials identical to Example 1. In this example the battery is built using two monopolar plates (one positive and one negative) 10 bipolar plates and one dual polar plate. The stack consists of one positive monopolar plate, five bipolar plates, one dual polar plate, five bipolar plates and one negative monopolar plate. Here the total amount of active material in the battery is the same as in Example 1. The dual polar plate in this example is assembled by attaching a copper tab to the negative side of a bipolar electrode, attaching a copper tab to positive side of a second bipolar electrode, assembling the two bipolar electrodes with a non-conductive layer between the two bipolar electrodes and such that the copper tabs are on the side of the electrode attached to the non-conductive plate. The tabs extend passed the bipolar electrode as to be connected outside of the cell. Positive active material is pasted onto the positive conductive face of the first bipolar electrode in of the dual polar plate and negative active material is pasted onto the negative conductive face of the dual polar plate. As a result the dual polar plate has both positive and negative active material disposed on either side similar to a standard bipolar plate but with the exception that the active materials are electrically isolated from each other due to the presence of the non-conductive plate. Further the extension of the copper tabs beyond the bipolar battery allow electrical communication to the two or more battery stacks. As in Example 1 the plates are pasted with identical active material recipes however with half the weight per plate as there are 2× the plates in this example. As in example 1, absorbent glass mat material is placed between the positive and active materials in each cell but similar to the paste is half the thickness. The stack is then assembled identical as Example 1. It is filled with acid 1.305 g/cc sulfuric acid to all cell simultaneously using the same procedure as example 1. The formation process is the same and the battery is topped off at the end of formation with 1.363 g/cc acid. After formation the positive terminal attached to the positive monopole is connected with the positive tab of the dual polar plate and the negative terminal attached to the negative monopole is connected with the negative tab of the dual polar plate. As a result the two stacks are connected in parallel within a single battery case with a common valve port for both stacks.

The two batteries from example 1 and 2 are then measured and tested. The results are listed in Table 1. Both batteries have nearly identical size with example 2 being slightly heavier due to the additional non-conductive plate and tabs/terminals. As seen both batteries at the 20 hour rate have similar capacities. However, the power is almost three times higher for the example 2 battery.

TABLE 1

|  | Example 1 | Example 2 |
| --- | --- | --- |
| Weight, g | 4540 | 4950 |
| OCV, V | 13.23 | 13.21 |
| 20 h Capacity, Ah | 16.92 | 16.21 |
| Impedance, mOhm | 46 | 15 |
| Cold Cranking Amps, A | 120 | 360 |

Example 3 is modelled using conventional bipolar battery construction to achieve the specified performance of a Group 31 battery as specified by the Battery Council International. Typical Group 31 batteries are listed in Table 2. To match the voltage capacity and cold cranking amps (CCA) a conventional bipolar battery construction would have large surface area plates with thin active material and separator. This results in a battery well outside BCI specified size for a Group 31 limiting market acceptance.

Example 4 is modelled using dual plate bipolar battery construction as described in this patent application to achieve the specified performance of a Group 31 battery as specified by the Battery Council International. The cell design of this battery (e.g. paste type, thickness, agm type thickness, acid type, etc) are the same as Example 3. The results are listed in Table 2. As seen, using the disclosed structures it is possible to build a bipolar battery that meets the Group 31 battery specifications both in performance and size. This is not achievable with a traditional bipolar monobloc.

TABLE 2

| Design | Voltage V | Capacity Ah | CCA A | Dimensions, mm (Height × Depth × Length) | Weight kg |
| --- | --- | --- | --- | --- | --- |
| Prismatic VRLA | 12 | 100 | 700 | 240 × 173 × 330 | 31.5 |
| Conventional Bipolar | 12 | 100 | 800 | 460 × 58 × 460 | 23.2 |
| Bipolar using dual polar plate | 12 | 101 | 800 | 240 × 138 × 330 | 23.5 |

Exemplary embodiments of the invention have been disclosed. A person of ordinary skill in the art recognizes that modifications fall within the teachings of this application. Any numerical values recited in the above application include all values from the lower value to the upper value in increments of one unit provided that there is a separation of at least 2 units between any lower value and any higher value. All possible combinations of numerical values between the lowest value and the highest value enumerated are to be considered to be expressly stated in this application. Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of the elements, ingredients, components or steps. Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

What is claimed is:

1. An article comprising:
   a) two or more stacks of battery plates comprising:
      (i) one or more bipolar plates comprising a substrate having an anode on one surface and a cathode on an opposite surface, wherein the substrate conducts current from the one surface to the opposite surface;
      (ii) a first monopolar plate disposed at one end of the two or more stacks of battery plates, wherein the first monopolar plate comprises:
         1) a cathode deposited on one surface; and
         2) a current collector in contact with the cathode;
      (iii) a second monopolar plate disposed at an opposite end of the two or more stacks of battery plates as the first monopolar plate, wherein the second monopolar plate comprises:
         1) an anode deposited on one surface; and
         2) a current collector in contact with the anode;
      wherein the battery plates are arranged such that the surfaces of the battery plates having one of the cathodes deposited thereon face the surface of another battery plate having one of the anodes deposited thereon;
   b) a liquid electrolyte disposed between each pair of battery plates to form a plurality of electrochemical cells,
   c) a plurality of separators, wherein each individual separator is located between the anode and the cathode of an individual electrochemical cell;
   d) a dual polar battery plate disposed between two of the two or more stacks of battery plates, the dual polar battery plate comprising:
      (i) a first conductive substrate having an anode material deposited on one surface and a first current conductor in contact with a portion of an opposite surface;
      (ii) a second conductive substrate with a cathode material deposited on one surface and a second current conductor in contact with a portion of an opposite surface; and
      (iii) a non-conductive substrate disposed between the first conductive substrate and the second conductive substrates;
   wherein the dual polar battery plate is arranged between the two of the two or more stacks of battery plates such that the surfaces of the dual polar battery plate having the anode material deposited thereon faces the surface of one of the battery plates in a first battery stack having one of the cathodes deposited thereon, and the surface of the dual polar battery plate having the cathode material deposited thereon faces the surface of one of the battery plates in a second battery stack having one of the anodes deposited on the surface; and
   e) one or more conductive conduits which connects the first current conductor and the second current conductor directly or indirectly to battery terminals.

2. The article according to claim 1, wherein the bipolar plates comprise polymeric substrates having a plurality of openings passing through the polymeric substrates in communication with both surfaces of the polymeric substrates; and
   wherein one or more of the plurality of openings are straight, have smooth surfaces, and are filled with a conductive material that undergoes a phase transformation at a temperature that is below a thermal degradation temperature of the polymeric substrates.

3. The article according to claim 1, wherein a membrane comprising a polymer is disposed about an entire periphery of the two or more stacks of battery plates, including about a periphery of the dual polar battery plate, so as to form a seal about edges of the battery plates which prevents the liquid electrolyte from flowing outside of the two or more stacks of battery plates.

4. The article according to claim 1, wherein one or more of the separators comprise a sheet having an integrated frame adhered to a periphery of the sheet; and
   wherein the integrated frames is adapted to be placed adjacent to a periphery of the substrates of the battery plates.

5. The article according to claim 4, wherein the substrates of the battery plates have raised edges about their periphery adapted to be disposed adjacent to the integrated frames of the separators.

6. The article of claim 5, wherein the non-conductive substrate includes an integrated frame about a periphery of the non-conductive substrate.

7. The article of claim 6, wherein the integrated frames of the separators and the integrated frame of the non-conductive substrate are adapted to match with the raised edges of adjacent battery plates to form a common edge and a seal between the electrochemical cells and an outside surface of the article.

8. The article according to claim 1, wherein the article includes one or more openings in each of the separators, the one or more bipolar plates, the first monopolar plate, the second monopolar plate, and the dual polar battery plate; and
   wherein the one or more openings are aligned to form an integrated channel; and
   wherein the integrated channel is transverse to a plane of the battery plates and the separators.

9. The article according to claim 8, wherein the one or more openings in the separators and the battery plates contain inserts located therein;
   wherein the inserts are adapted to mate to form the integrated channel in the two or more stacks of battery plates, and the integrated channel passes through the liquid electrolyte; and
   wherein the inserts contain vent holes which communicate between the integrated channel and the electrochemical cells.

10. The article according to claim 9, wherein the inserts are bonded to or integral with the battery plates thereby forming seals at a junction between the separators and the battery plates.

11. The article according to claim 1, wherein the two or more stacks of battery plates and the dual polar battery plate are connected in series by connecting the first current conductor and the second current conductor for the dual polar battery plate through one of the one or more conductive conduits.

12. The article according to claim 1, wherein a current conductor connected to a cathode through a conductive substrate is connected through one or more of the conductive conduits to a positive terminal, directly or indirectly and another current conductor connected to an anode through a conductive substrate is connected through one or more of the conductive conduits to a negative terminal, directly or indirectly.

13. The article according to claim 12, wherein internal sets of cells are independently electrochemically formed.

14. The article according to claim 1, wherein the first current conductor, the second current conductor, or both are placed in contact with one or both of the first monopolar plate and the second monopolar plates.

15. The article according to claim 14, wherein the first current conductor and the second current conductor are independently placed in contact with each of the first and the second monopolar plates.

16. The article according to claim 15, wherein the first current conductor and the second current conductor are terminal conductive connectors of the article and protrude through a case or membrane about the article and function as the battery terminals or connect to the battery terminals.

17. The article of claim 14, wherein individual terminals are covered in a membrane leaving only a single connected positive terminal and a single connected negative terminal exposed.

18. An article comprising:
a) two or more stacks of battery plates comprising:
 (i) one or more bipolar plates comprising:
  1) a substrate;
  2) an anode on one surface of the substrate; and
  3) a cathode on an opposite surface of the substrate, wherein the substrate conducts current from the one surface to the opposite surface;
 (ii) a first monopolar plate disposed at one end of the two or more stacks of battery plates, wherein the first monopolar plate comprises:
  1) a cathode deposited on one surface; and
  2) a current collector in contact with the cathode;
 (iii) a second monopolar plate disposed at an opposite end of the two or more stacks of battery plates as the first monopolar plate, wherein the second monopolar plate comprises:
  1) an anode deposited on one surface; and
  2) a current collector in contact with the anode;
 wherein the battery plates are arranged such that the surfaces of the battery plates having one of the cathodes deposited thereon face the surface of another battery plate having one of the anodes deposited thereon;
b) a liquid electrolyte disposed between each pair of battery plates to form a plurality of electrochemical cell;
c) a plurality of separators, wherein each individual separator is located between the anode and the cathode of an individual electrochemical cell, and wherein the separator includes a sheet having an integrated frame adhered about a periphery of the sheet;
d) a dual polar battery plate disposed between two of the two or more stacks of battery plates, the dual polar battery plate comprising:
 (i) a first conductive substrate having an anode material deposited on one surface and a first current conductor in contact with a portion of an opposite surface;
 (ii) a second conductive substrate with a cathode material deposited on one surface and a second current conductor in contact with a portion of an opposite surface; and
 (iii) a non-conductive substrate disposed between the first conductive substrate and the second conductive substrate, wherein the non-conductive substrate includes an integrated frame about a periphery;
 wherein the dual polar battery plate is arranged between the two of the two or more stacks of battery plates such that the surface of the dual polar battery plate having the anode material deposited thereon faces the surface of one of the battery plates in a first battery stack having one of the cathodes deposited thereon, and the surface of the dual polar battery plate having the cathode material deposited thereon faces the surface of one of the battery plates in a second battery stack having one of the anodes deposited on the surface; and
e) one or more conductive conduits which connects the first and the second current conductors directly or indirectly to battery terminals; and
 wherein the integrated frames of the separators and the non-conductive substrate match with edges of adjacent battery plates to form a seal between the electrochemical cells and the outside of the article.

19. The article of claim 18, wherein the substrates of the battery plates have raised surfaces about their periphery adapted to be disposed adjacent to the integrated frames and match to form a common edge.

20. The article of claim 19, wherein a membrane comprising a polymer is disposed about an entire periphery of the two or more stacks of battery plates, including about a periphery of the dual polar battery plate, so as to form a seal about edges of the battery plates which prevents the liquid electrolyte from flowing outside of the two or more stacks of battery plate.

* * * * *